(12) United States Patent
Yamamoto et al.

(10) Patent No.: US 7,545,729 B2
(45) Date of Patent: *Jun. 9, 2009

(54) MEDIUM, APPARATUS, AND METHOD OF RECORDING OPTICAL-INFORMATION

(75) Inventors: Yuichiro Yamamoto, Tokyo (JP);
Shinichi Tatsuta, Tokyo (JP); Yuji Kubota, Kanagawa (JP); Akiko Hirao, Chiba (JP); Kazuki Matsumoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 159 days.

This patent is subject to a terminal disclaimer.

(21) Appl. No.: 11/674,506

(22) Filed: Feb. 13, 2007

(65) Prior Publication Data
US 2007/0223326 A1    Sep. 27, 2007

(30) Foreign Application Priority Data
Mar. 24, 2006   (JP) ............................. 2006-083760

(51) Int. Cl.
*G11B 7/24* (2006.01)
(52) U.S. Cl. .............................. 369/275.3; 369/112.15; 369/112.1
(58) Field of Classification Search ... 369/275.1–275.5, 369/103, 44.26, 44.28, 112.05, 112.17, 44.13, 369/112.1, 112.15
See application file for complete search history.

(56) References Cited

U.S. PATENT DOCUMENTS 6,873,595 B2 *   3/2005   Kondo et al. ............. 369/275.4
6,982,127 B2 *   1/2006   Kondo et al. ................ 428/836
2007/0230292 A1 * 10/2007   Yamamoto et al. ....... 369/44.26

FOREIGN PATENT DOCUMENTS

| JP | 2003-085768 | 3/2003 |
| JP | 2003-178458 | 6/2003 |
| JP | 2004-158113 | 6/2004 |
| JP | 2004-265472 | 9/2004 |

OTHER PUBLICATIONS

Horimai et al, A Novel Collinear Optical Setup for Holographic Data Storage, Optical Storage Data, 2004, pp. 297-303, 2004.
Horimae et al, Advanced Collinear Holography, Optical Review, 2005, pp. 90-92, vol. 12, No. 2.

* cited by examiner

*Primary Examiner*—Ali Neyzari
(74) *Attorney, Agent, or Firm*—Turocy & Watson, LLP

(57) ABSTRACT

An optical-information recording medium includes a substrate that includes a servo surface; an information recording layer laminated on the servo surface of the substrate capable of recording information as a hologram produced by interference between an information beam containing the information and a reference beam; a tracking servo area that is formed in a track direction on the servo surface, and that records therein tracking information for tracking servo control; and a following up servo area that is formed in the track direction on the servo surface, and that is to be irradiated by a beam emitted from an optical-information recording apparatus for recording the information in the information recording layer so as to make the beam follow a rotation of the optical-information recording medium.

19 Claims, 16 Drawing Sheets

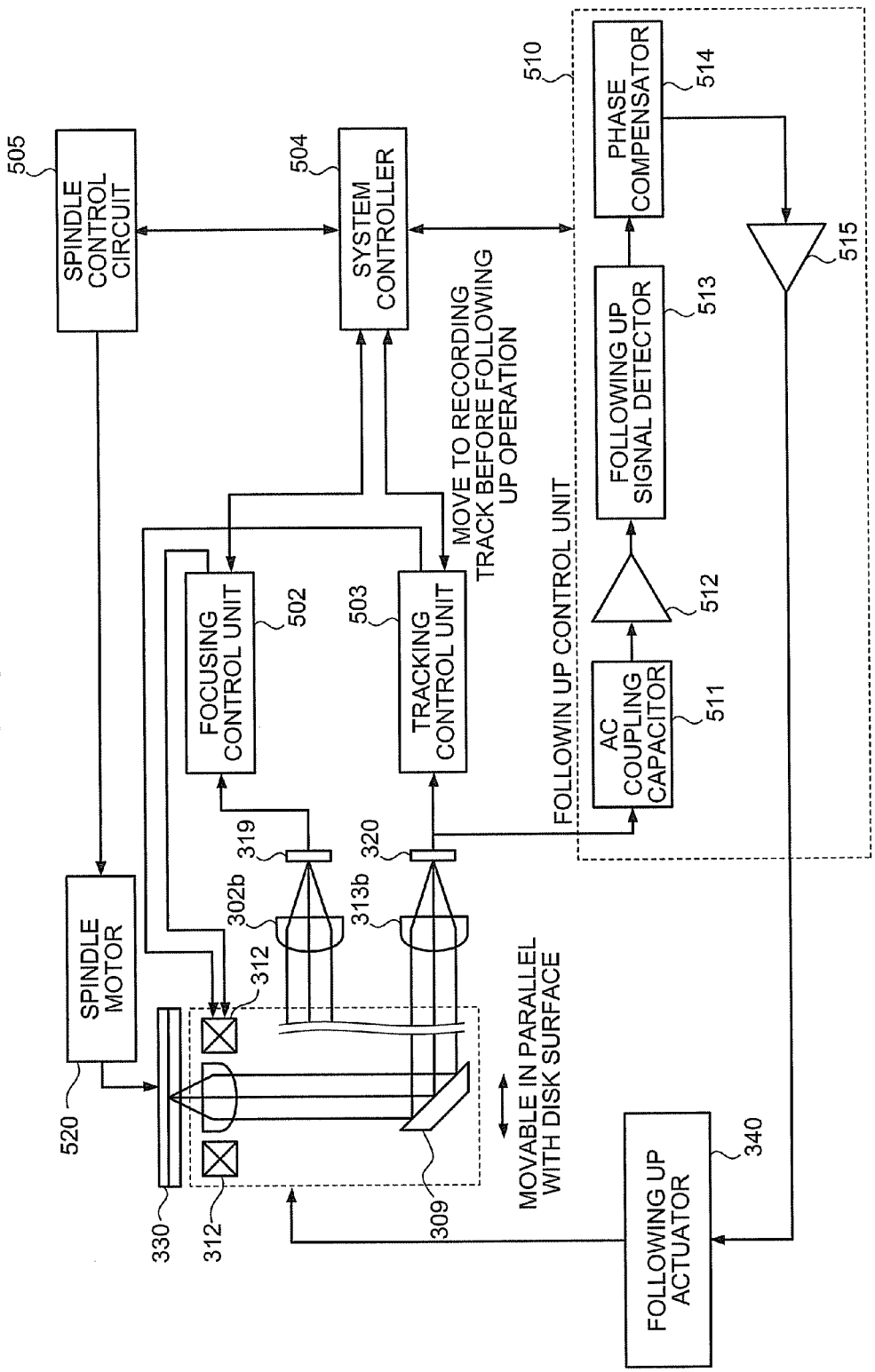

PIT ROW

PIT ROW

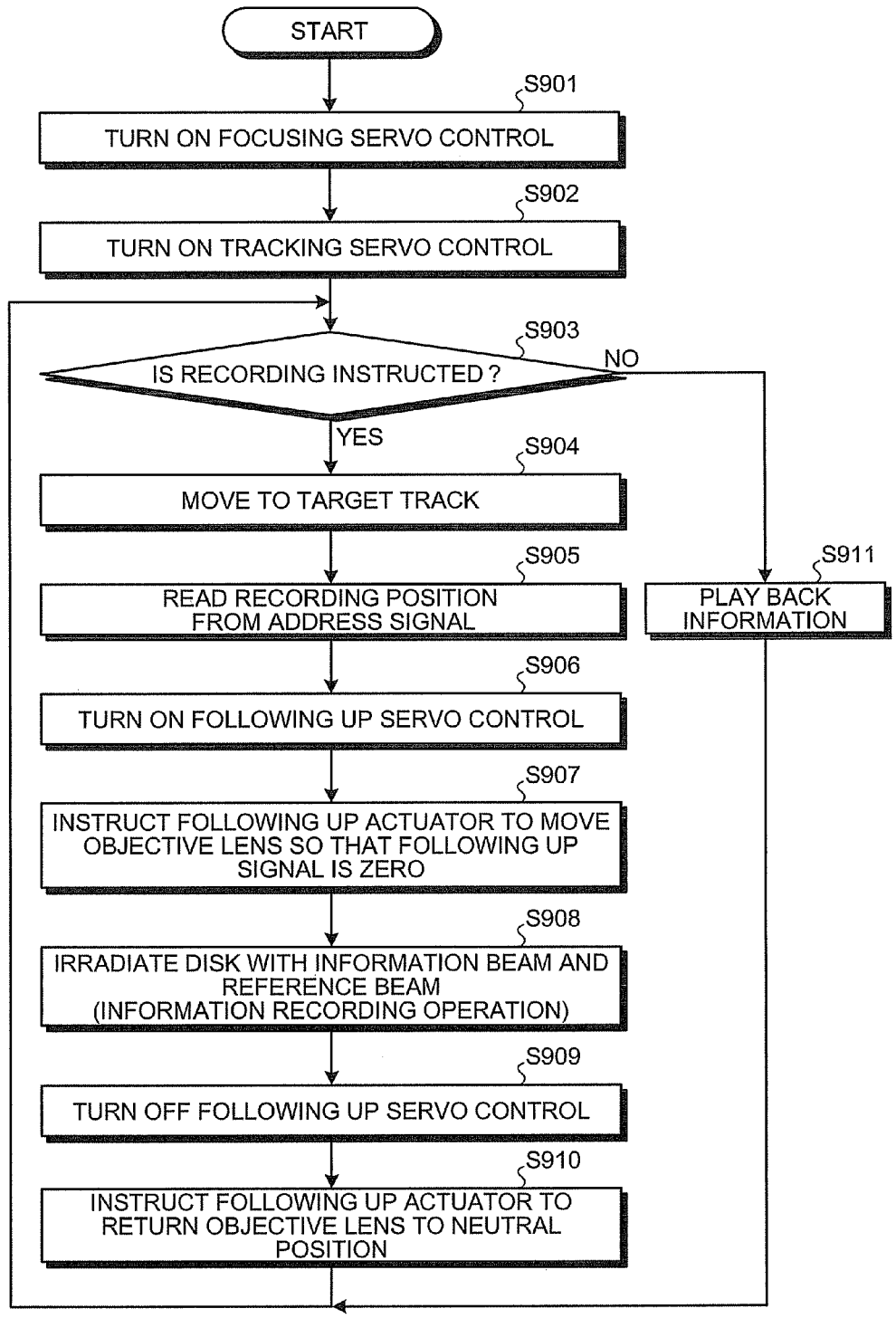

MEDIUM, APPARATUS, AND METHOD OF RECORDING OPTICAL-INFORMATION

CROSS-REFERENCE TO RELATED APPLICATIONS

This application is based upon and claims the benefit of priority from the prior Japanese Patent Application No. 2006-83760, filed on Mar. 24, 2006; the entire contents of which are incorporated herein by reference.

BACKGROUND OF THE INVENTION

1. Field of the Invention

The present invention relates to an optical information recording medium, an optical information recording apparatus and an optical information recording method for recording information as hologram.

2. Description of the Related Art

High-density stacked-volumetric optical disks using holography (hereinafter, "holographic optical disks") and record-playback apparatus for the holographic optical disks have been actively developed for practical use. The holographic optical disks record information by interfering an information beam that includes an image to be recorded with a reference beam for recording the image in a photosensitive material, and records a two-dimensional image resulting from digital encoding by a spatial light modulator such as a liquid crystal device and a digital micromirror device. The information is three-dimensional record that can be recorded in the longitudinal direction of an information recording layer. The information can be multiplexed at an identical location or overlapping locations of the information recording layers. This allows much more information to be recorded than conventional optical recording method of recording information in a plane such as high definition digital versatile disk (HD DVD) standard and Blu-ray standard. Moreover, because the information can be read in the unit of two-dimensional image, the holographic optical disk is advantageous in that the information can be transferred at a high speed.

Among various technologies developed for the record-playback apparatus for the holographic optical disk, collinear holographic recording method in which the information beam and the reference beam are aligned on the same axis is focused on as a replacement of the optical disk record-playback apparatus compliant with the HD DVD or the Blu-ray.

Technologies of the collinear holographic recording are disclosed in "Advanced Collinear Holography" (Optical Review, Vol. 12, No. 2, 90-92 (2005)), "A Novel Collinear Optical Setup for Holographic Data Storage System" (Proceedings of SPIE of Optical Data Storage 2004, pp. 297-303 (2004)), JP-A 2004-265472 (KOKAI), and the like. Based on the collinear holographic recording technology, the spatial light modulator produces the information beam and the reference beam as a record-playback laser by modulating the light intensity of a green or blue-violet laser beam, and an objective lens focuses the information beam and the reference beam on the information recording layer of the optical disk. The information beam and the reference beam are overlapped in the information recording layer to produce an interference fringe pattern, and the interference fringe pattern is fixed in the information recording layer, whereby the information is recorded as a hologram.

The collinear holographic recording method uses a shift multiplexing method of recording the information while the holographic optical disk rotates, namely while shifting locations on the holographic optical disk. The information on the holographic optical disk is played back by focusing only the reference beam for playing back on the information recording layer using the objective lens, accepting the diffracted light from the interference fringe pattern in the information recording layer by a solid-state image sensor using a complementary metal oxide semiconductor (CMOS) or charge-coupled device (CCD), and decoding the accepted two-dimensional image.

A focusing servo and a tracking servo on the holographic optical disk use a red laser beam whose wavelength is different from that of the record-playback laser (a green or blue-violet laser beam), and the servo control is performed in the same manner as with the existing record-playback method such as the HD DVD and the Blu-ray.

More specifically, when the conventional technology is used, the record-playback apparatus for the holographic optical disk cannot rotate the disk at a high speed at the time of recording, thereby an overhead time is required for shifting from the recording operation to the playing back operation, and seek time cannot be shortened.

In other words, to write refractive-index modulation in the information recording layer using the information beam and the reference beam, a certain exposure time is required. When the optical disk rotates at the high speed to record the information, an exposure position moves, and therefore a sharp interference-fringe pattern cannot be formed. The displacement during the exposure is a very serious problem in the system architecture because the holographic recording includes writing fine refractive-index modulation using the photosensitive material that has a high spatial resolution.

When the optical disc rotates at a low speed to prevent the displacement during the exposure, the record-playback apparatus cannot change from the recording operation to the playing back operation at the high speed.

To solve the problem, JP-A 2003-85768 (KOKAI) discloses a technology using a following up mechanism that makes an irradiating light follow the rotation of the optical disk. The following up mechanism enables the record-playback apparatus to irradiate the information beam and the reference beam while tracking the disk rotation so that the relative velocity of the beams to the optical disk is zero during the exposure.

According to the technology, a record-playback laser beam and a servo laser beam are focused on the same plane, and the optical disk includes pits for address servo, information recording area, and lockup pits for following up intermittently on an identical track. By the servo laser beam irradiating so as to follow the lockup pit, the record-playback apparatus detects an amount of disk travel and moves the record-playback laser beam to record the hologram based on the detected amount.

However, according to the technology disclosed in JP-A 2003-85768 (KOKAI), a position of the source of the following up laser beam is displaced sequentially from an optical axis of a collimating lens according to the recording position. In other words, the light source itself is mechanically driven, and therefore the light source needs to be mounted with a high accuracy. As a result, the following up is not accurate enough to put the record-playback apparatus to practical use.

Moreover, because the relative velocity of the recording beam to the optical disk becomes zero during the following up, it is difficult to perform an accurate tracking servo control.

It is therefore difficult to perform an accurate positioning of the recording beam to the target recording position.

SUMMARY OF THE INVENTION

According to one aspect of the present invention, an optical-information recording medium includes a substrate that includes a servo surface; an information recording layer laminated on the servo surface of the substrate capable of recording information as a hologram produced by interference between an information beam containing the information and a reference beam; a tracking servo area that is formed in a track direction on the servo surface, and that records therein tracking information for tracking servo control; and a following up servo area that is formed in the track direction on the servo surface, and that is to be irradiated by a beam emitted from an optical-information recording apparatus for recording the information in the information recording layer so as to make the beam follow a rotation of the substrate, wherein the tracking servo area and the following up servo area are arranged in parallel extending in circumferential direction on the substrate.

According to another aspect of the present invention, an optical-information recording apparatus includes a motor that rotates an optical-information recording medium; a recording light source that emits a recording beam; a servo light source that emits a servo beam; a spatial light modulator that converts the recording beam to an information beam containing information and a reference beam; a diffractive optical element that diffracts the servo beam and divides the servo beam into at least a first diffracted beam and a second diffracted beam; a condenser that focuses the information beam and the reference beam on an optical-information recording medium, focuses the first diffracted beam on a following up servo area, and focuses the second diffracted beam on a tracking servo area, the optical-information recording medium being included: a substrate that includes a servo surface, an information recording layer laminated on the servo surface of the substrate capable of recording information as a hologram produced by interference between an information beam that includes the information and a reference beam, the tracking servo area that is formed in a track direction on the servo surface, and that records therein tracking information for tracking servo control, and the following up servo area that is formed in the track direction on the servo surface, and that is to be irradiated by a beam so as to make the beam follow a rotation of the substrate, wherein the tracking servo area and the following up servo area are arranged in parallel extending in circumferential direction on the substrate; a servo photo-detector that detects a first reflection reflected from the following up servo area and a second reflection reflected from the tracking servo area; a irradiation-position shifting unit that shifts irradiation positions of the first diffracted beam and the second diffracted beam on the optical-information recording medium by moving the condenser; and a following up control unit that performs following up servo control to control the irradiation-position shifting unit based on the first reflection by shifting the irradiation positions of the first diffracted beam and the second diffracted beam to follow rotation of the optical-information recording medium so that relative velocity between the optical-information recording medium and the irradiation positions is substantially zero, and that controls the recording light source to emit the recording beam during the following up servo control.

According to still another aspect of the present invention, an optical-information recording method includes rotating an optical-information recording medium; emitting a recording beam; emitting a servo beam; converting the recording beam to an information beam containing information and a reference beam; diffracting the servo beam to divide the servo beam into at least a first diffracted beam and a second diffracted beam; focusing the information beam and the reference beam on an optical-information recording medium; focusing the first diffracted beam on a following up servo area; focusing the second diffracted beam on a tracking servo area, the optical-information recording medium being included: a substrate that includes a servo surface, an information recording layer laminated on the servo surface of the substrate capable of recording information as a hologram produced by interference between an information beam that includes the information and a reference beam, the tracking servo area that is formed in a track direction on the servo surface, and that records therein tracking information for tracking servo control, and the following up servo area that is formed in the track direction on the servo surface, and that is to be irradiated by a beam so as to make the beam follow a rotation of the substrate, wherein the tracking servo area and the following up servo area are arranged in parallel extending in circumferential direction on the substrate; detecting a first reflection reflected from the following up servo area and a second reflection reflected from the tracking servo area; shifting irradiation positions of the first diffracted beam and the second diffracted beam on the optical-information recording medium; performing following up servo control based on the first reflection by shifting the irradiation positions of the first diffracted beam and the second diffracted beam to follow rotation of the optical-information recording medium so that relative velocity between the optical-information recording medium and the irradiation positions is substantially zero; and emitting the recording beam during performing the following up servo control.

BRIEF DESCRIPTION OF THE DRAWINGS

FIG. 5 is a block diagram of a servo system in the record-playback apparatus according to the first embodiment;

FIG. 9 is a flowchart of a process of recording and playing back a holographic record according to the first embodiment;

DETAILED DESCRIPTION OF THE INVENTION

Exemplary embodiments of the present invention are explained below in detail referring to the accompanying drawings. The present invention is not limited to the embodiments explained below.

Figure 1:
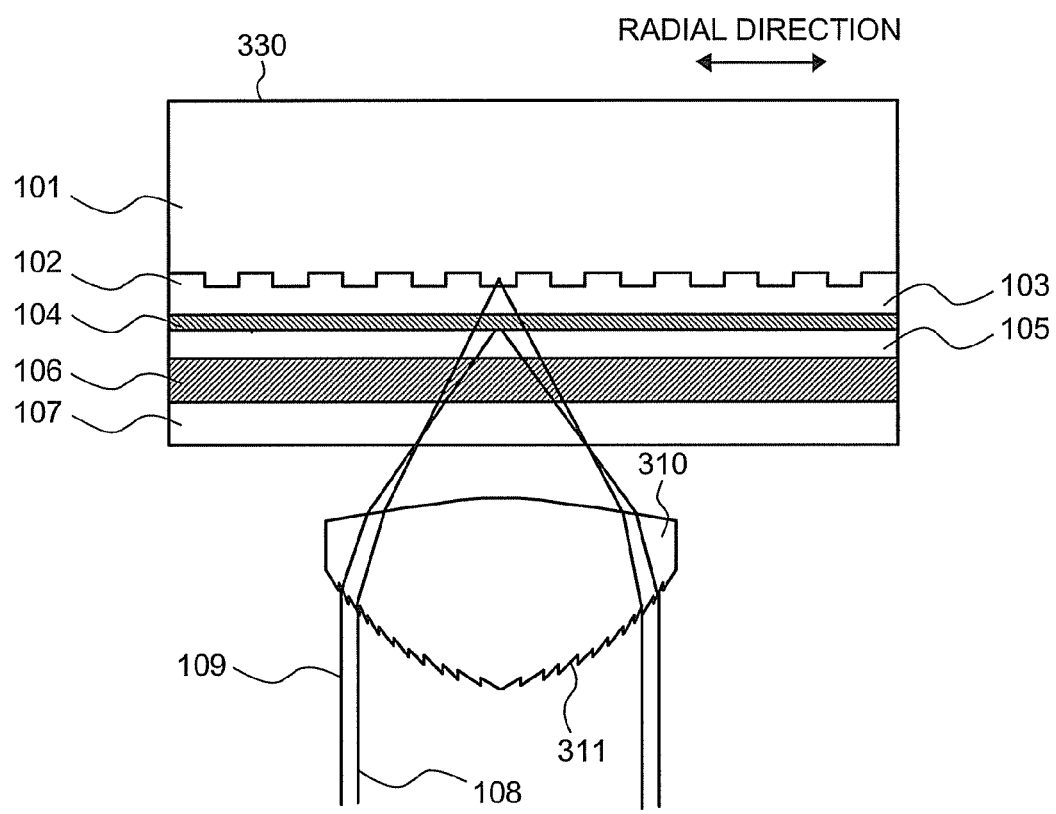
FIG. 1 is a cross sectional view of a holographic optical disk according to a first embodiment of the present invention.

FIG. 1 is a cross sectional view of a holographic optical disk 330 according to a first embodiment. The holographic optical disk 330 is a recording medium that can record holograms of interference fringe patterns formed by bright and dark fringes caused by interference between information beam and reference beam. The holographic optical disk 330 includes a substrate 101 made of polycarbonate, a transparent gap layer 103, a dichroic mirror layer 104, a transparent gap layer 105, a holographic-recording medium layer 106 in which information is recorded, and a protective layer 107 that protects the holographic-recording medium layer 106, layered in the order. The holographic disk further includes a servo surface 102 formed on a surface of the substrate 101 that faces the holographic-recording medium layer 106, and the servo surface 102 includes guiding grooves or ridges (hereinafter, abbreviated as "patterns") or pits for focusing servo control, tracking servo control, and following up servo control formed thereon.

The state shown in FIG. 1 is that an objective lens 310 focuses a servo laser beam 108 with a first wavelength on the servo surface 102 and a record-playback beam 109 with a second wavelength different from the first wavelength on the dichroic mirror layer 104.

According to the first embodiment, a red laser or an infrared laser with the wavelength in a 650 nanometer bandwidth or 780 nanometer bandwidth is used as the servo laser beam 108 with the first wavelength, and a blue-violet laser with the wavelength in a 405 nanometer bandwidth is used as the record-playback beam 109 with the second wavelength in view of availability of a semiconductor laser and design freedom. Otherwise, a green laser with the wavelength in a 532 nanometer bandwidth can be used as the record-playback beam 109.

The servo laser beam 108 and the record-playback laser beam 109 transmit through the transparent gap layers 103 and 105. The gap layer 103 is formed by applying UV resin or the like on the substrate 101 by spin-coating method or the like. The gap layer 105 is formed by applying UV resin or the like on the dichroic mirror layer 104 by spin-coating method or the like. The gap layers 103 and 105 are provided to form gaps between the holographic-recording medium layer 106 and the servo surface 102 so that an interference area for the information beam and the reference beam is formed with a certain size in the holographic-recording medium layer 106 to control size of the holograms generated therein.

The dichroic mirror layer 104 is formed by applying an optical wavelength filter on the gap layers 103 and 105 by dielectric multilayer coating (sputtering). The dichroic mirror layer 104 transmits the servo laser beam 108 therethrough and reflects the record-playback laser beam 109. This nature causes the information beam and the reference beam of the record-playback laser beam 109 interfere with each other in the holographic-recording medium layer 106 so that the information can be recorded therein as a hologram.

The holographic-recording medium layer 106 is formed by a material that is sensitive to the record-playback laser beam 109 and insensitive to the servo laser beam 108, such as photopolymer. The photopolymer is a photosensitive material taking advantage of photopolymerization of monomers, and generally includes the monomer, a photopolymerization initiator, and a porous matrix that retains volume of the photopolymer before and after the recording. Film thickness of the holographic-recording medium layer 106 is a few hundreds of micrometers to achieve diffraction efficiency sufficient to play back signals.

A hologram is recorded in the holographic-recording medium layer 106 in the following manner. The information beam and the reference beam are overlapped in the holographic-recording medium layer 106 and the interference fringe pattern is formed. At this time, the photopolymerization initiator in the photopolymer is activated by absorbing photons, and promotes the polymerization of the monomer in the bright area of the interference fringe pattern. When the polymerization progresses and the monomer in the bright area is consumed, the monomer is supplied from the dark area to the bright area, and thus the density difference is generated between the bright area and the dark area of the interference fringe pattern. This forms the refractive index modulation corresponding to the intensity distribution in the interference fringe pattern, and thus the holographic recording is performed.

The servo laser beam 108 is focused on the servo surface 102 by the objective lens 310. The record-playback laser beam 109 is focused on the dichroic mirror layer 104 by the objective lens 310. The objective lens 310 is a single lens with both surfaces aspherical to be light enough to reduce load on servo control operation. Moreover, the objective lens 310 is a hybrid objective lens that has a diffraction grating 311 on the surface facing the incident beam to correct chromatic aberration to be optimal for the wavelength of the servo laser beam 108 and the wavelength of the record-playback laser beam 109. The record-playback laser beam 109 uses a zeroth order beam diffracted by the diffraction grating 311, and the servo laser beam 108 uses a first order beam diffracted by the diffraction grating 311 to be focused. Such a configuration can be easily realized by using a technology of an existing lens compatible with a digital versatile disk (DVD) and a compact disk (CD). When different numerical apertures for the objective lens 310 are used between the servo laser beam 108 and the record-playback laser beam 109, an aperture-limiting filter that selects predetermined wavelengths is provided right in front of the objective lens 310.

Figure 2:
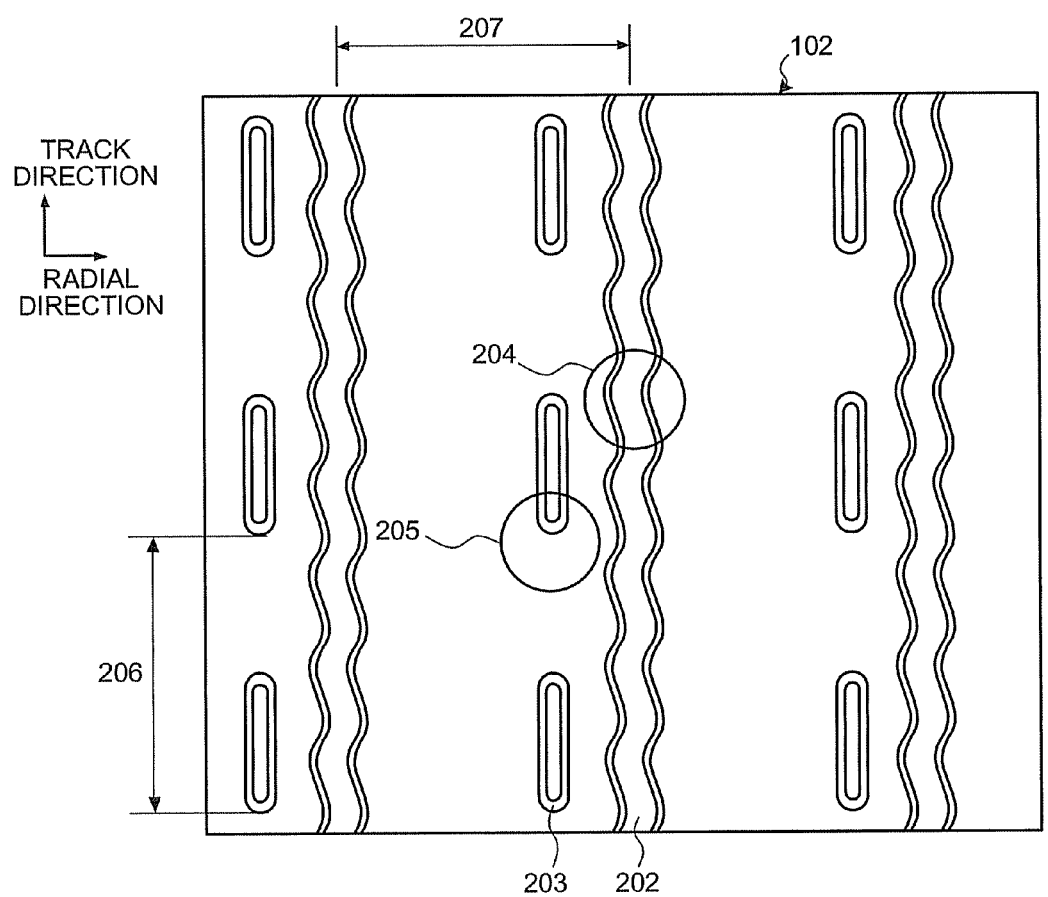
FIG. 2 is an enlarged top view of a servo surface according to a first embodiment.

FIG. 2 is an enlarged top view of the servo surface 102. The servo surface 102 includes a wobbling sequential-guidance pattern 202 that is used for tracking servo control as a tracking servo area, and a pit row 203 used for following up servo control. A pair of the wobbling sequential-guidance pattern 202 and the pit row 203 is arranged spirally in parallel to each other, starting near the center and ending near the periphery of the holographic optical disk 330. A diffracted beam 204 irradiates a point on the wobbling sequential-guidance pattern 202, and a diffracted beam 205 irradiates an edge of a pit in the pit row 203.

The pit row 203 is a single-cycle pit row that includes a plurality of pits assuming the shift distance for shift-multiplexing the hologram as a single cycle 206.

The wobbling sequential-guidance pattern 202 runs slightly winding in the radial direction forming sine waves, and extends in the track direction. The winding is called a wobble, where address signals and basic clock information that bases timings of various operations are embedded.

Assuming the wavelength of the servo laser beam 108 as $\lambda$ and the refractive index of the substrate as n, preferable depth of the wobbling sequential-guidance pattern 202 is about $\lambda/8/n$, at which amplitude of a push-pull signal indicative of a tracking error is the maximum value. The depth of grooves in a land/groove recording medium such as a digital versatile disk random access memory (DVD-RAM) is about $\lambda/6/n$ taking into account a distance to an adjacent crosstalk of a mark for the recording. However, the preferable depth of the pattern according to the first embodiment is about $\lambda/8/n$ because the servo surface is dedicated to only the servo signals.

The distance 207 between two adjacent wobbling sequential-guidance patterns 202 is same as the shift distance for shift-multiplexing recording so that a pair of the wobbling sequential-guidance pattern 202 and the pit row 203 is arranged within the shift distance. The shift distance is at least three micrometers so as to sufficiently reduce the crosstalk by an adjacent hologram. Because the distance is much longer than a 0.74 micrometer track pitch of a digital versatile disk read only memory (DVD-ROM) and the like, various preformatted signals such as the servo signals, the address signals, and disk information can be embedded in the area. The large area advantageously includes the wobbling sequential-guidance pattern 202 and the pit row 203 arranged in parallel in the radial direction, and the various preformatted signals intermittently arranged in series on a single track.

To record the refractive index modulation in the holographic-recording medium layer 106 using the information beam and the reference beam, a certain time is required for exposure. When the holographic optical disk 330 rotates at a high speed during the recording, the exposure position moves and sharp interference fringe pattern cannot be generated. Because the fine refractive index modulation needs to be recorded using a photosensitive material with a high spatial resolution, displacement during the exposure is a very serious problem for the holographic recording.

Figure 16:
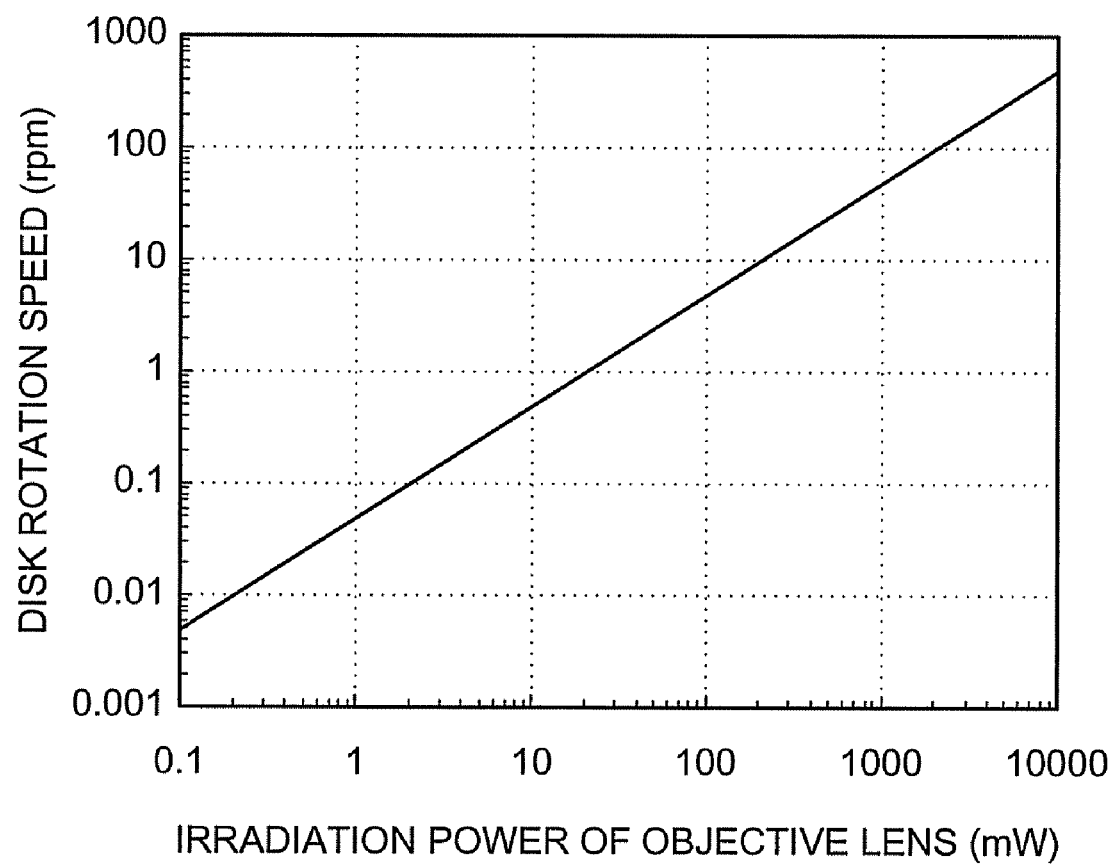
FIG. 16 is a chart for explaining relation between irradiation power of an objective lens and acceptable rotational speed of a disk.

FIG. 16 is a chart for explaining relation between irradiation power of an objective lens and acceptable rotational speed of the disk assuming that the acceptable displacement during the exposure is one micrometer. While an amount of energy required for the exposure depends on the recording medium, it is assumed five microjoules, and the position of the exposure on the disk is assumed 40 millimeters from the center of the disk. Taking into account that the optical disk record-playback apparatus will be produced as a commercial product, it is preferable to use a small and low-power semiconductor laser as a source of the record-playback laser beam. If the semiconductor laser is used and the irradiation power of the objective lens is a reasonable value of 100 milliwatts, as seen in FIG. 16, the acceptable rotational speed is as low as 4.8 rpm. When the rotational speed is so low, it takes some time to shift from the recording operation to the playing back operation.

As described above, because the wobbling sequential-guidance pattern 202 and the pit row 203 are arranged in parallel on the holographic optical disk 330, the optical disk record-playback apparatus emits a beam to the wobbling sequential-guidance pattern 202 and another beam to the pit row 203 at the same time, whereby performing following up servo control and the holographic recording at a time. Following up servo control is to control the beam spots by shifting those of the diffracted beams 204 and 205 and the record-playback laser beam 109 in accordance with the rotation of the holographic optical disk 330 so that the relative velocity between the radiating points and the holographic optical disk 330 is substantially zero. "The relative velocity is substantially zero" herein means that the relative velocity is within the tolerance for recording in the holographic-recording medium layer 106 unless otherwise specified.

Focusing servo control, tracking servo control, and following up servo control is performed by dividing the servo laser beam 108 into the diffracted beam 204 that is a plus-first order beam and the diffracted beam 205 that is a minus-first order beam using the diffraction grating 311, and emitting the diffracted beam 204 to the wobbling sequential-guidance pattern 202 and the diffracted beam 205 to the pit row 203 respectively. When following up servo control is performed and the diffracted beam 205 irradiates an end of each pit, a hologram is recorded in the holographic-recording medium layer 106. More specifically, the hologram is recorded when the center of the area irradiated by the diffracted beam 205 reaches the end of each pit.

Figure 3:
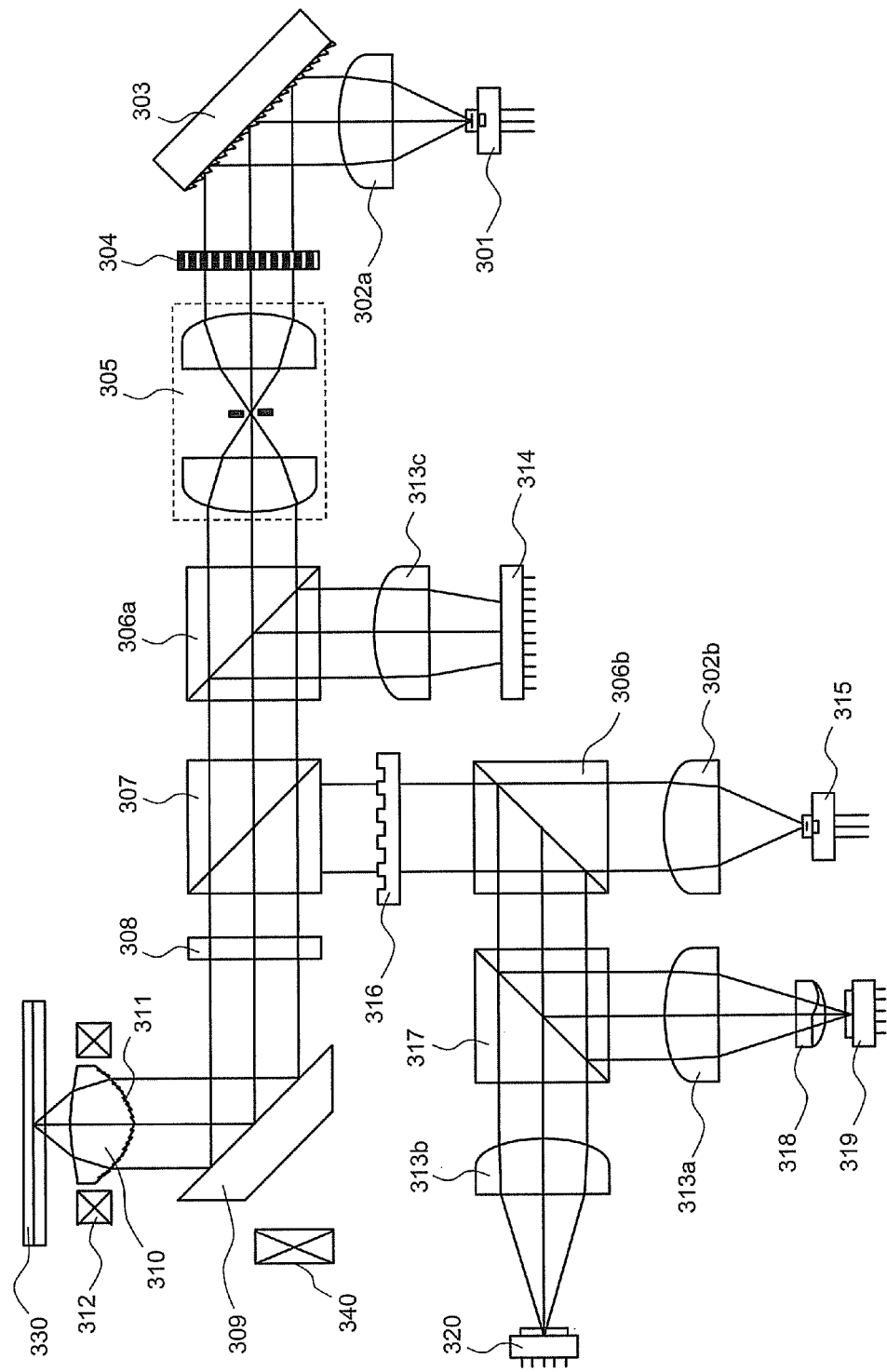
FIG. 3 is a schematic view for explaining a configuration of an optical system in a record-playback apparatus according to the first embodiment.

FIG. 3 is a schematic view for explaining a configuration of an optical system in a record-playback apparatus for holographic-optical-disk according to the first embodiment. The record-playback apparatus records and plays back information in the holographic optical disk 330, and uses collinear holographic recording method, where the information beam and the reference beam are coaxially arranged.

The optical system in the record-playback apparatus for the holographic-optical-disk includes a semiconductor laser 301 that emits the record-playback laser beam 109, a semiconductor laser 315 that emits the servo laser beam 108, collimating lenses 302a and 302b, a diffraction grating 303 as a resonator, a spatial light modulator 304, a spatial filter 305, polarization beam splitters 306a and 306b, a diffraction grating 316, a beam splitter 317, a dieclock prism 307, a quarter-wave plate 308, a reflecting mirror 309, the objective lens 310, condenser lenses 313a, 313b, and 313c, a cylindrical lens 318, photodetectors 319 and 320, and a metal oxide semiconductor (CMOS) type solid-state image sensor 314. An actuator 312 and a following up actuator 340 are also shown in FIG. 3 as part of a servo system, which will be explained later.

The semiconductor laser 301 emits the blue-violet laser with the second wavelength in the 405 nanometer bandwidth as the record-playback laser beam 109. The linearly polarized beam emitted from the semiconductor laser 301 is converted from a diverging beam to a parallel beam by the collimating lens 302a. The semiconductor laser 301 causes a mode-hopping phenomenon that an oscillating wavelength fluctuates due to change of the operating temperature or the electric current, which is not desirable for holographic optical disks that allow a very tight margin for the shift of the wavelength. To prevent mode-hopping phenomenon, the diffraction grating 303 is disposed right after the collimating lens 302a, and the beam diffracted by the diffraction grating 303 returns to the semiconductor laser 301 to form a resonator that oscillates at a desired wavelength. The first embodiment uses a simple Littrow resonator to return the first order diffracted beam to the semiconductor laser 301 and extract the zeroth order diffracted beam with a stable wavelength. However, a Littman resonator can be used for the diffraction grating 303 instead of the Littrow resonator. If a distributed-feed-back (DFB) laser having little shift of the wavelength and a long coherence length is put into practical use in future, use of the DFB laser as the semiconductor laser 301 will require no diffraction grating 303.

After being emitted from the diffraction grating 303, the zeroth order beam of the record-playback laser beam 109 enters the spatial light modulator 304. The spatial light modulator 304 performs an optical intensity modulation and converts the zeroth order beam to the reference beam and the information beam. As the spatial light modulator 304, a liquid crystal device, a digital micromirror device, a ferroelectric liquid crystal device as responsive as a few tens microseconds, and the like can be used.

Figure 4A:
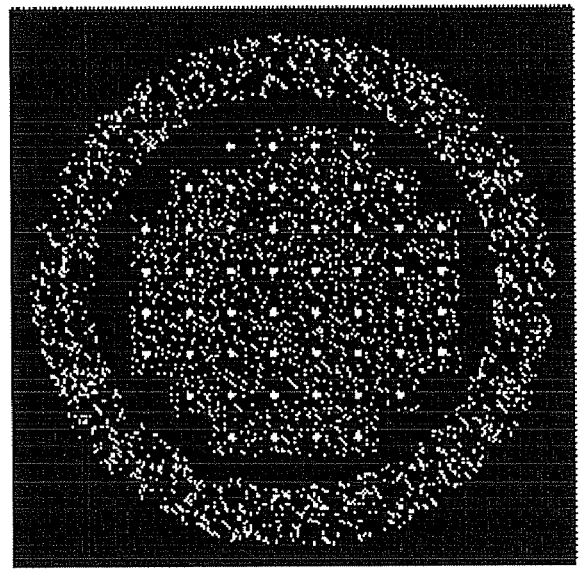
FIG. 4A is a schematic view for explaining a modulation pattern for recording a reference beam and an information beam.
Figure 4B:
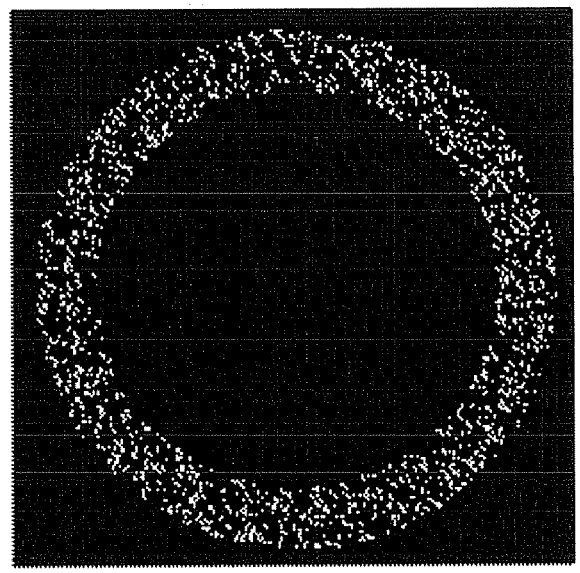
FIG. 4B is a schematic view for explaining a modulation pattern for playing back a reference beam and an information beam.

FIGS. 4A and 4B are schematic views for explaining modulation patterns of the reference beam and the information beam using the spatial light modulator 304. FIG. 4A shows a recording pattern, and FIG. 4B shows a playing back pattern.

The information pattern includes a binary pattern that includes digitally encoded information and error correction codes. The data amount in the information beam area is about 10 to 20 kilobits per frame, though it depends on the performance of the spatial light modulator 304, the pixel count of the image sensor, and the encoding method. While the first embodiment uses the binary pattern of "0" and "1", a multi-numbered pattern can also be used. The multi-numbered pattern includes an extremely increased amount of data per frame.

The spatial filter 305 includes two lenses and a pinhole. The reference beam and the information beam emitted from the spatial light modulator 304 enter the spatial filter 305 to be cleared of unnecessary high-order diffracted lights.

After being emitted from the spatial filter 305, the reference beam and the information beam transmits through the polarization beam splitter 306a and the dieclock prism 307, and the quarter-wave plate 308 converts them to circularly polarized beams. The reference beam and the information beam are then reflected by the reflecting mirror 309, and condensed by the objective lens 310 on the holographic optical disk 330.

The reference beam and the information beam are reflected by the holographic optical disk 330, proceeds through the objective lens 310 in the opposite direction, and are converted by the quarter-wave plate 308 to linearly polarized beams that cross the former linearly-polarized beams at right angles. The linearly-polarized reflected beams are reflected by the polarization beam splitter 306a, condensed by the condenser lens 313c, and accepted by the CMOS solid-state image sensor 314 in the form of a two-dimensional image.

The servo control performed by the record-playback apparatus according to the first embodiment includes focusing servo control, tracking servo control, and following up servo control.

The semiconductor laser 315 emits a red laser or an infrared laser with the first wavelength in a 650 nanometer bandwidth or 780 nanometer bandwidth as the servo beam. A linearly polarized beam emitted from the semiconductor laser 315 is converted by the collimating lens 302b from a divergent beam to a parallel beam. The parallel beam transmits through the polarization beam splitter 306b, enters the diffraction grating 316 to be diffracted, and is divided into a zeroth order beam, a plus-first order beam, and a minus-first order beam. Among the three diffracted beams, the plus-first order beam irradiates the wobbling sequential-guidance pattern 202 on the servo surface 102 of the holographic optical disk 330 as the diffracted beam 204, and the minus-first order beam irradiates the pit row 203 as the diffracted beam 205.

The diffraction grating 316 is a common diffraction grating that has a rectangular cross section of the grating, and the depth (or height) of the grating pattern is designed to achieve desired diffraction efficiency. The three diffracted beams from the diffraction grating 316 are depicted as a single beam in FIG. 3 for convenience of explanation. By using a polarizing diffraction grating as the diffraction grating 316, the servo beam is polarized only when it proceeds toward the holographic optical disk 330, whereby improving the light use efficiency.

The three diffracted beams are reflected by the dieclock prism 307, circularly polarized by the quarter-wave plate 308, reflected by the reflecting mirror 309, and condensed on the servo surface 102 by the objective lens 310. The quarter-wave plate 308 polarizes both of the record-playback laser beam 109 and the servo laser beam 108. The servo laser beam 108 (diffracted beam) is reflected by the servo surface 102, proceeds through the objective lens 310 in the opposite direction, and is converted by the quarter-wave plate 308 to linearly polarized beams that cross the former linearly-polarized beams at right angles. The linearly-polarized reflected beam is reflected by the dieclock prism 307 and the polarization beam splitter 306b, and divided by the beam splitter 317 into a reflected beam and a transmitted beam.

The beam reflected by the beam splitter 317 is converted from a parallel beam to a convergent beam by the condenser lens 313a, is diffracted at and transmits through the cylindrical lens 318, and is condensed by the photodetector 319. The photodetector 319 converts optical power of the condensed beam to electrical signals. A beam spot condensed by the photodetector 319 performs focusing servo control by driving the actuator 312.

The beam transmitted through the beam splitter 317 is converted from a parallel beam to a convergent beam by the condenser lens 313b, and condensed by the photodetector 320. A beam spot condensed by the photodetector 320 performs tracking servo control by driving the actuator 312, and performs the track-focusing servo control by driving the following up actuator 340. Focusing servo control, tracking servo control, and following up servo control will be detailed later.

FIG. 5 is a block diagram of the servo system in the record-playback apparatus for the optical disk according to the first embodiment. The record-playback apparatus includes a spindle motor 520, a spindle control circuit 505, the actuator 312, a focusing control unit 502, a tracking control unit 503, the following up actuator 340, a following up control unit 510, and a system controller 504.

The spindle motor 520 rotates the holographic optical disk 330, and the spindle control circuit 505 controls the drive of the spindle motor 520.

The actuator 312 moves the objective lens 310 in the radial direction and the track direction of the disk (horizontal directions in FIG. 3) and in the direction vertical to the disk (longitudinal direction in FIG. 3) according to instructions from the focusing control unit 502 and the tracking control unit 503. The focusing control unit 502 performs focusing servo control of the objective lens 310 by driving the actuator 312 based on the beam spot detected by the photodetector 319. The tracking control unit 503 performs tracking servo control by driving the actuator 312 based on the beam spot detected by the photodetector 320. The following up actuator 340 moves the objective lens 310 and the reflecting mirror 309 as a unit in the track direction of the disk according to the instruction from the following up control unit 510.

The following up control unit 510 performs following up servo control by driving the following up actuator 340 based on the beam spot detected by the photodetector 320. The following up actuator 340 drives so that the radiating points of the diffracted beams 204 and 205 and the record-playback laser beam 109 follow the rotation of the holographic optical disk, i.e. so that the relative velocity between the holographic optical disk 330 and the radiating points is substantially zero. The system controller 504 issues various instructions to the spindle control circuit 505, the focusing control unit 502, the tracking control unit 503, and the following up control unit 510.

The focusing control unit 502 performs focusing servo control based on astigmatism in the following manner. The reflected beam condensed on the photodetector 319 represents an ellipse depending on the focus error of the beam spot condensed on the holographic optical disk 330. The direction of the longitudinal axis of the ellipse varies depending on the direction of the focus error. Taking advantage of this nature, the focusing control unit 502 generates focus error signals and issues an instruction to the actuator 312 based on the focus error signals, and the actuator 312 drives the objective lens 310 in the vertical direction to the holographic optical disk 330 to focus on the servo surface 102. While the first embodiment uses the astigmatism method as a typical method of detecting the focus error, another method such as a knife edge method or a beam size method can be used.

Tracking servo control and following up servo control are performed based on the beam spot of the reflection detected by the photodetector 320.

Figure 6:
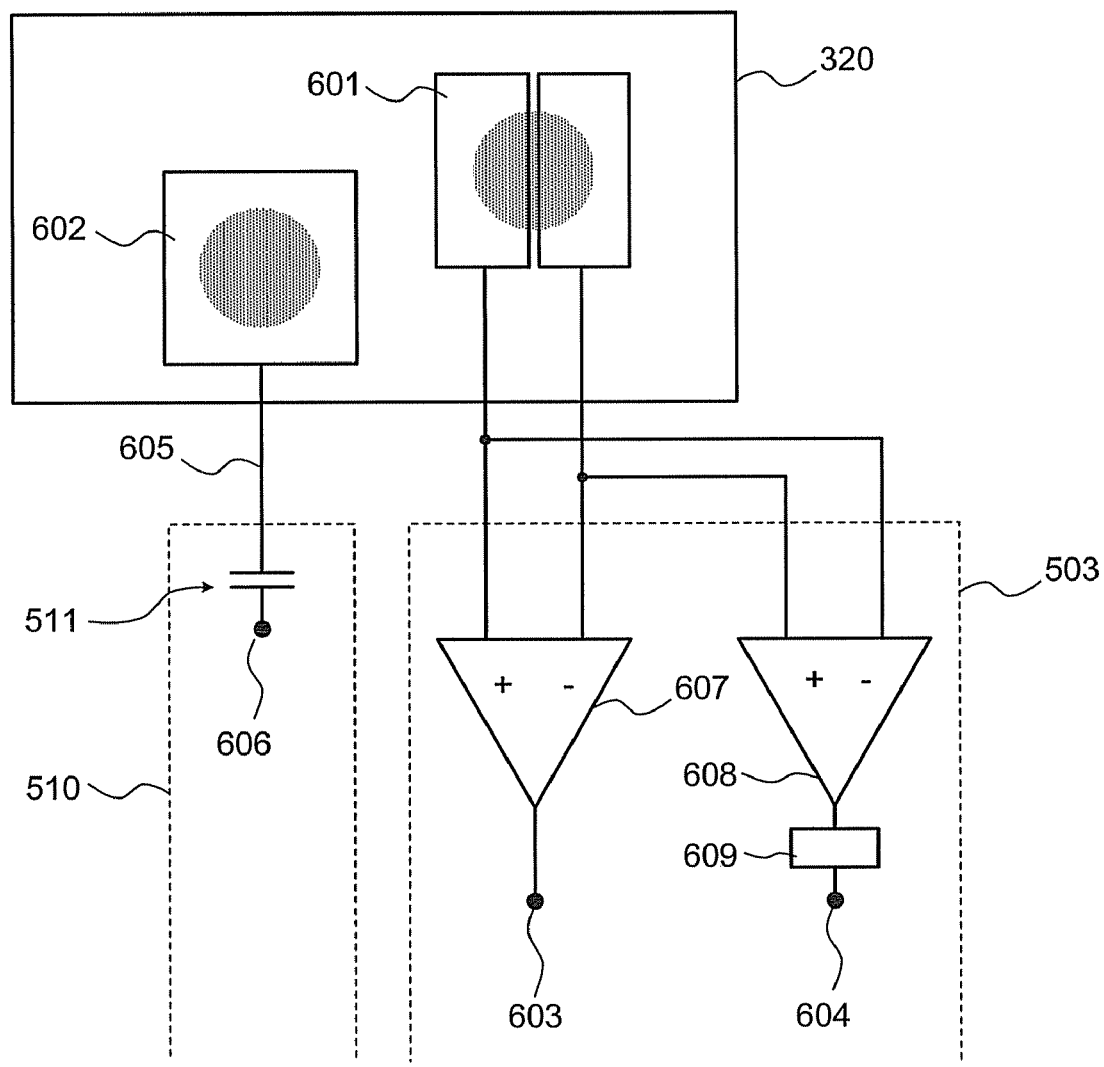
FIG. 6 is a schematic view for explaining a configuration of a photo detector.

FIG. 6 is a schematic view for explaining a configuration of photosensitive surfaces of the photodetector 320, arrangement of the beam spot on each of acceptance surfaces, and signal circuits that produce tracking-error signals and following up signals. The reflection of the diffracted beam 204 for the servo control from the servo surface 102 shown in FIG. 2 enters a acceptance surface 601, the reflection of the diffracted beam 205 for the servo control from the servo surface 102 enters a acceptance surface 602, and each of the beams forms a beam spot on the corresponding acceptance surface.

A push-pull method is used herein for tracking servo control. The acceptance surface 601 is divided into two sections dividing the beam spot into two. Two electrical signals converted from the divided beam spots are input to a differential circuit 607 in the tracking control unit 503, and a differential signal output from the differential circuit 607 is output as a push-pull signal 603 indicative of the tracking error. The tracking control unit 503 performs tracking servo control based on the push-pull method using the push-pull signal 603.

The two electrical signals converted from the divided beam spots are input to a differential circuit 608 in the tracking control unit 503, and a multiple signal output through a band-path filter 609 is output as a high-frequency output signal 604 based on wobbles in the wobbling sequential-guidance pattern 202. The tracking control unit 503 acquires an address signal from the high-frequency output signal 604, and positions the record-playback laser beam 109 at a target position on the target track based on the acquired address signal.

An electrical signal 605 is converted from the beam spot on the acceptance surface 602 and AC-coupled by an AC coupling capacitor 511 in the following up control unit 510, whereby producing a following up signal 606 that is an alternating component. The following up signal 606 is amplified by an amplifier 512 in the following up control unit 510 and detected by a following up signal detector 513, shown in FIG. 5. After oscillation is prevented by a phase compensator 514 that controls the phase, the following up signal 606 is further amplified by an amplifier 515 and output to the following up actuator 340.

Figure 7A:
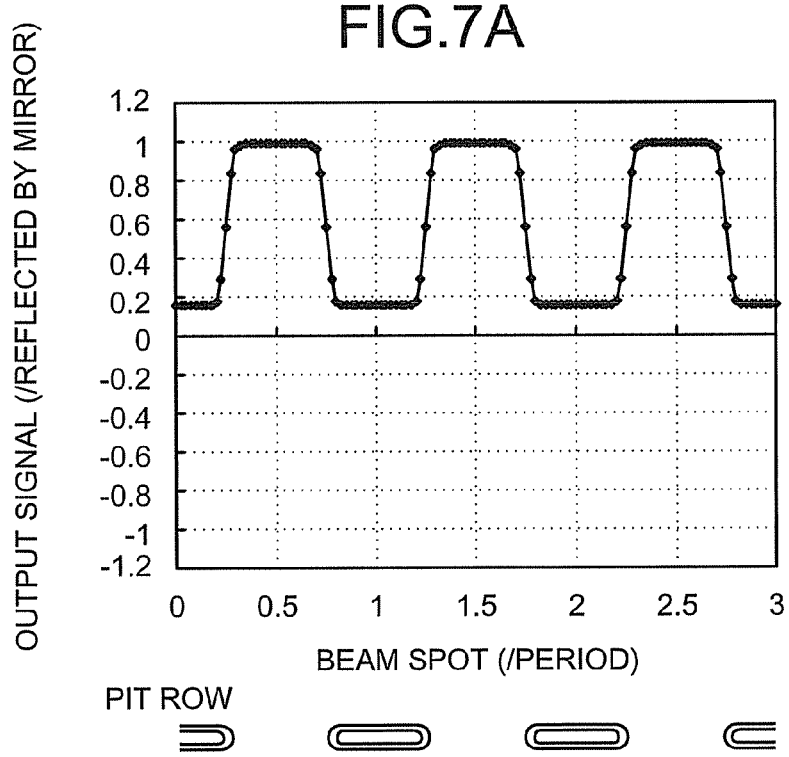
FIGS. 7A and 7B are schematic views for explaining states of signals obtained from reflection of a servo laser beam irradiated to a pit row for following up.
Figure 7B:
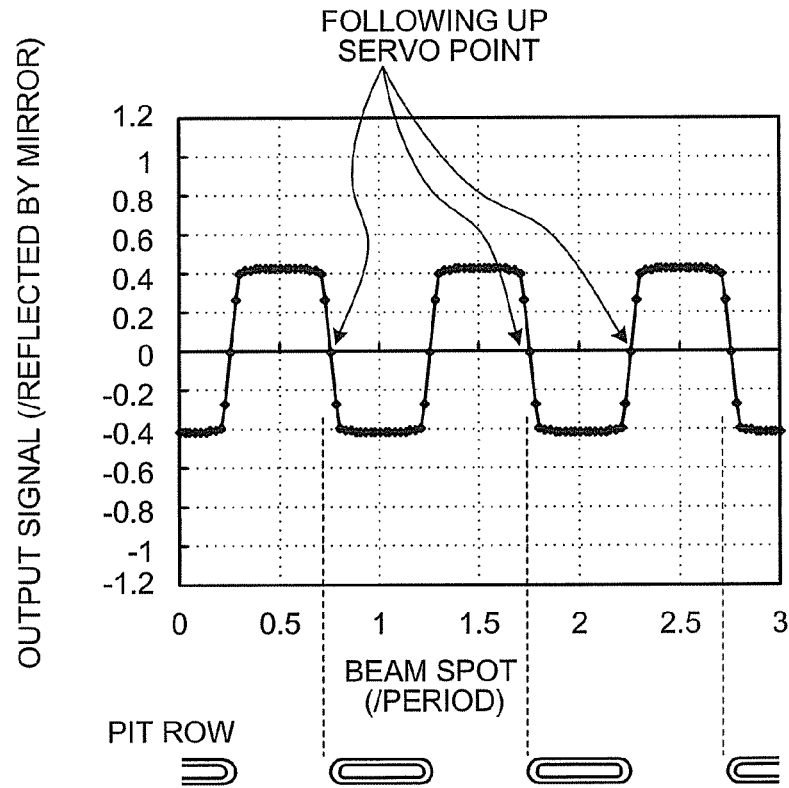

FIGS. 7A and 7B are schematic views for explaining states of the signals acquired from the reflection of the diffracted beam 205 for the servo control irradiated to the pit row 203. States of the signals acquired by computer simulation are plotted in FIGS. 7A and 7B. The horizontal axis indicates positions of the diffracted beam 205 aiming at a coordinate fixed on the holographic optical disk 330, and the vertical axis indicates signal intensity level. The output signal shown in FIG. 7A is the electrical signal 605 acquired from the beam spot accepted by the acceptance surface 602, and the output signal shown in FIG. 7B is the following up signal 606 acquired by AC-coupling the electrical signal 605.

The analysis was performed based on the pit width and the pit depth equal to those of a DVD-ROM assuming that the wavelength of the diffracted beam 205 is 605 nanometers, the pit length if five micrometers, the repetition cycle is 10 micrometers. The result shows the periodic signals that have the maximum value of substantially 100 percent when the radiating point is in a mirror area where no pit is present, and the minimum value of about 16 percent when the radiating point is at the center of the pit. Each of FIGS. 7A and 7B includes three cycles of the pits in the pit row 203. The zero cross point of the output signal arrowed in FIG. 7B corresponds to the end of each pit.

This means that the holographic recording in the holographic-recording medium layer 106 can be performed by emitting the record-playback laser beam 109 from the semiconductor laser 301 while the following up control unit 510 performs following up servo control at the zero cross point by letting the diffracted beams 204 and 205 follow the rotation of the holographic optical disk 330.

More specifically, the diffracted beams 204 and 205 are irradiated on the wobbling sequential-guidance pattern 202 and the pit row 203 at the same time, the tracking control unit 503 performs the tracking control based on the reflection of the diffracted beam 204, the tracking control unit 503 acquires the address signal to read the recording position from it. The tracking control unit 503 then drives the following up actuator 340 to move the objective lens 310 and the reflecting mirror 309 to move the beam spot of the diffracted beams 204 and 205 and the record-playback laser beam 109, so that the following up signal of the reflection of the diffracted beam 205 from the pit row 203 is zero.

According to the computer simulation, the sensitivity of the servo signal is 0.98/μm, which is very high. The sensitivity of the signal herein is defined as the amount changed per the tracing distance by the beam spot in the track direction when the signal amount is normalized on the timing of the reflection on the mirror surface. The highly sensitive signal enables the holographic recording by accurately aligning the beam spots to the recording point.

Figure 8A:
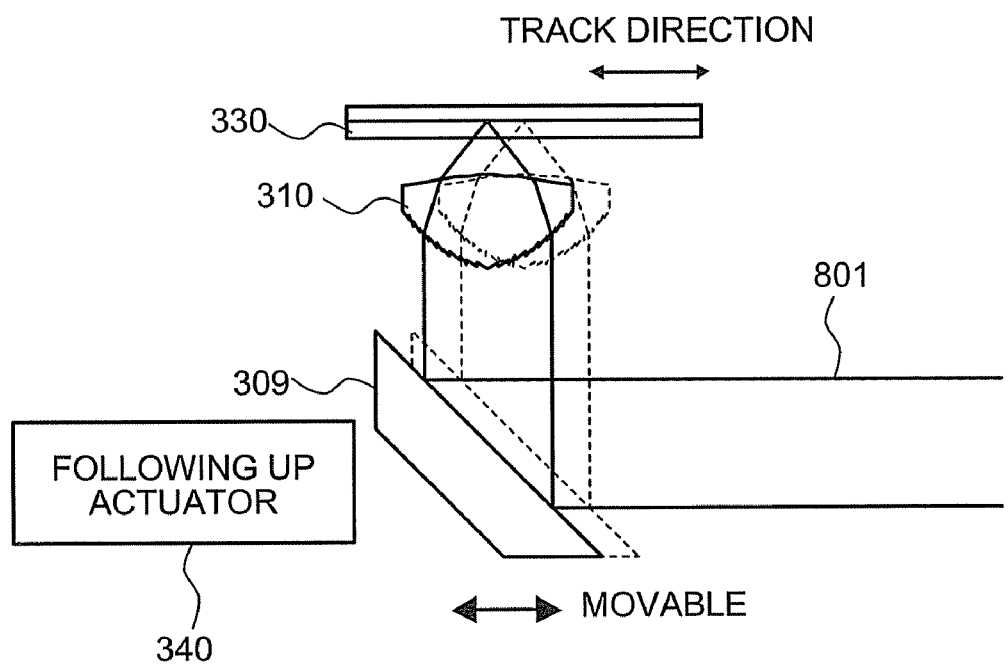
FIG. 8A is a schematic view for explaining a method of moving an beam spot of a diffracted beam and a record-playback laser beam on the holographic optical disk using a following up actuator.

FIG. 8A is a schematic view for explaining a method of moving the beam spot of the diffracted beams 204 and 205 and the record-playback laser beam on the holographic optical disk 330 using the following up actuator 340. The reflecting mirror 309 and the objective lens 310 are driven as a unit in the track direction of the holographic optical disk 330 (in the lateral direction in FIG. 8A). Both of the record-playback laser beam 109 and the servo laser beam 108 are indicated as a beam 801 in FIG. 8A for convenience of explanation.

Figure 8B:
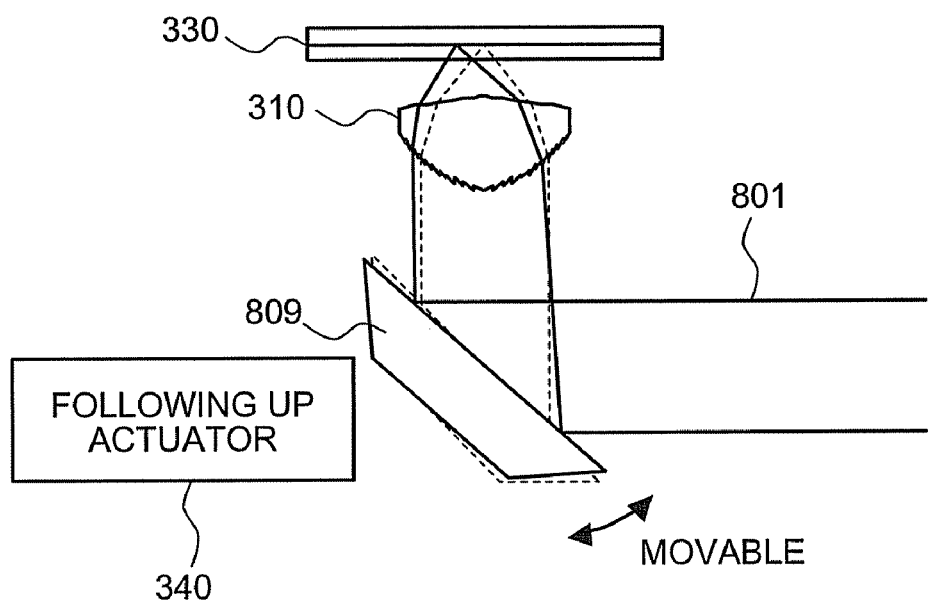
FIG. 8B is a schematic view for explaining another method of moving an beam spot of a diffracted beam and a record-playback laser beam on the holographic optical disk using a following up actuator.

While the beam spot is shifted by the following up actuator 340 moving the reflecting mirror 309 and the objective lens 310 as a unit in the track direction according to the first embodiment, the record-playback apparatus is not limited to use the shifting method. For example, as shown in FIG. 8B, the record-playback apparatus can use a galvanometer mirror 809 instead of the reflecting mirror 309 and move the irradiating position by rotating the galvanometer mirror 809 without moving the objective lens 310. This method is applicable when the travel distance of the beam spot is short and the aberration generated by an oblique incidence of the beam into the objective lens 310 is within a tolerance.

FIG. 9 is a flowchart of a process of recording and playing back a holographic record according to the first embodiment. The focusing control unit 502 turns on focusing servo control based on the instruction from the system controller 504, and starts focusing servo control using the astigmatism method based on the reflection of the servo laser beam 108 accepted by the photodetector 319 (step S901). More specifically, the focusing control unit 502 performs focusing servo control by driving the actuator 312 using the focusing error signal acquired from the reflection of the servo laser beam 108.

The tracking control unit 503 turns on tracking servo control based on the instruction from the system controller 504, and starts tracking servo control using the push-pull method based on the reflection of the servo laser beam 108 (the diffracted beam 204) accepted by the photodetector 320 (step S902). More specifically, the tracking control unit 503 performs tracking servo control by driving the actuator 312 using the push-pull signal acquired from the reflection of the servo laser beam 108 accepted by the acceptance surface 601.

The system controller 504 determines whether the instructed process is recording on the holographic optical disk 330 (step S903). When the instruction is not recording (NO at step S903), the record-playback apparatus plays back the information in the holographic-recording medium layer 106 (step S911). More specifically, the semiconductor laser 301 emits the record-playback laser beam 109 to irradiate the holographic optical disk 330 with the reference beam with the pattern of the spatial light modulator 304 as shown in FIG. 4B. The CMOS solid-state image sensor 314 accepts the reflection of the reference beam, whereby playing back the information of the hologram recorded in the holographic-recording medium layer 106 in the form of a two-dimensional image.

On the other hand, when the instruction is recording information on the holographic optical disk 330 (YES at step S903), the tracking control unit 503 moves the beam spot to the target track (step S904). The tracking control unit 503 acquires the address signal from the reflection of the diffracted beam 204 accepted by the acceptance surface 601 of the photodetector 320 and reads the target position to record the information from the address signal (step S905).

The following up control unit 510 turns on following up servo control based on the instruction from the system controller 504, and starts following up servo control (step S906). The following up control unit 510 performs following up servo control by acquiring a following up signal from the reflection of the diffracted beam 205 accepted by the acceptance surface 602 of the photodetector 320, driving the following up actuator 340 so that the following up signal indicates substantially zero, and moving the objective lens 310 and the reflecting mirror 309 in the track direction (step S907). As a result of this, the diffracted beam 205 irradiates an end of a pit on the pit row 203.

The following up control unit 510 controls the semiconductor laser 301 to emit the record-playback laser beam 109 while the following up actuator 340 drives to retain the following up signal at substantially zero (step S908). The record-playback laser beam 109 is converted into the information beam and the reference beam by the spatial light modulator 304, the information beam and the reference beam interfere with each other in the holographic-recording medium layer 106, and the holographic information is thus recorded. "Substantially zero" herein means near zero or within the tolerance for recording in the holographic-recording medium layer 106 unless otherwise specified.

When the information recording operation is completed, the following up control unit 510 turns off the following up control based on the instruction from the system controller 504 and terminates the following up servo control (step S909). The following up control unit 510 then drives the following up actuator 340 to return the objective lens 310 and the reflecting mirror 309 to the neutral position (step S910). The record-playback apparatus repeats the processes in steps S903 and after.

Figure 10:
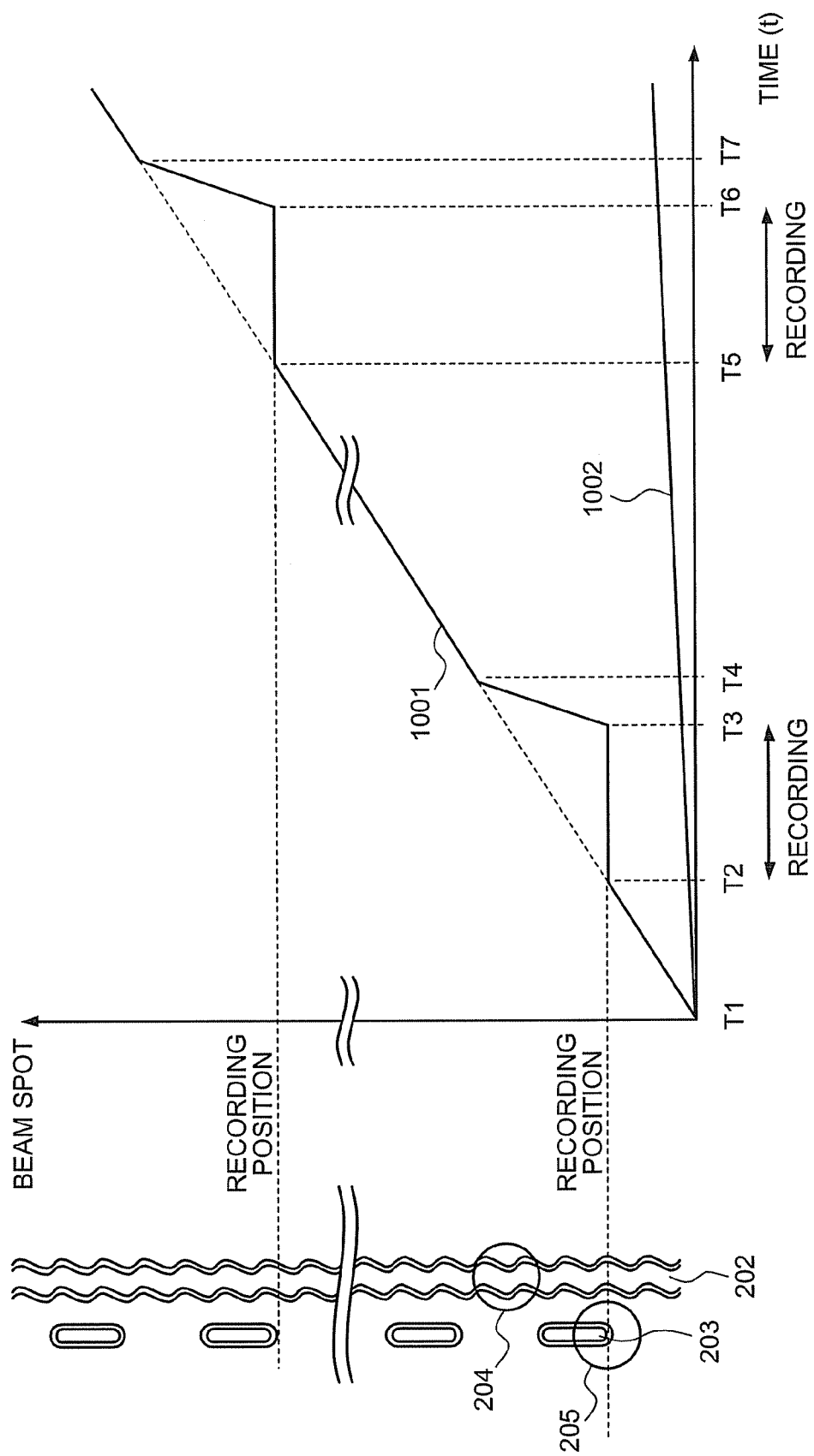
FIG. 10 is a schematic view for explaining relation between an operation of the holographic recording and the beam spot of the diffracted beam of the servo laser according to the first embodiment.

FIG. 10 is a schematic view for explaining relation between operation of the holographic recording and the beam spot of the diffracted beams 204 and 205 in the record-playback apparatus for a holographic-optical-disk according to the first embodiment. In FIG. 10, the horizontal axis indicates time and the vertical axis indicates the irradiated positions of the diffracted beams 204 and 205 aiming at the coordinate fixed on the holographic optical disk 330. The pit row 203 and the wobbling sequential-guidance pattern 202 are also shown corresponding to the vertical axis. A line 1001 represents temporal alteration of the beam spot of the diffracted beam 205 on the pit row 203 when the recording operation is performed using the holographic optical disk 330 and the record-playback apparatus according to the first embodiment. A line 1002 represents the temporal alteration of the beam spot when the recording operation is performed using an existing optical disk record-playback apparatus without following up servo control.

During a period between T2 and T3 and a period between T5 and T6, the following up is controlled so that the following up signal is substantially zero, the beam follows the end of the pit in the pit row 203 on the rotating holographic optical disk 330, and the holographic recording operation is performed during these periods.

A period between T3 and T4 and a period between T6 and T7 are transition periods from the following up control to the normal operation. During a period between T1 and T2, a period between T4 and T5, and a period after T7, the holographic recording operation is not performed, and therefore the line 1001 inclines according to the rotation of the disk during these periods.

On the other hand, because the following up control is not performed, the existing record-playback apparatus requires the optical disk to rotate at a very low speed as indicated by the line 1002 to keep the misalignment during the exposure within the tolerance.

During the holographic recording operation in the period between T2 and T3 and the period between T5 and T6, the relative velocity between the disk rotation and the diffracted beams 204 and 205 on the disk is substantially zero. Because the record-playback apparatus uses a sequential servo control method using the wobbling sequential-guidance pattern 202 for tracking, the diffracted beam 204 constantly acquires stable tracking error signal (push-pull signal) during the holographic recording operation. The record-playback apparatus according to the first embodiment is therefore advantageous in that the tracking control is stable no matter the holographic recording operation is performed, and that the record-playback apparatus is highly compatible with the existing optical disk that uses the sequential servo control method.

Figure 11:
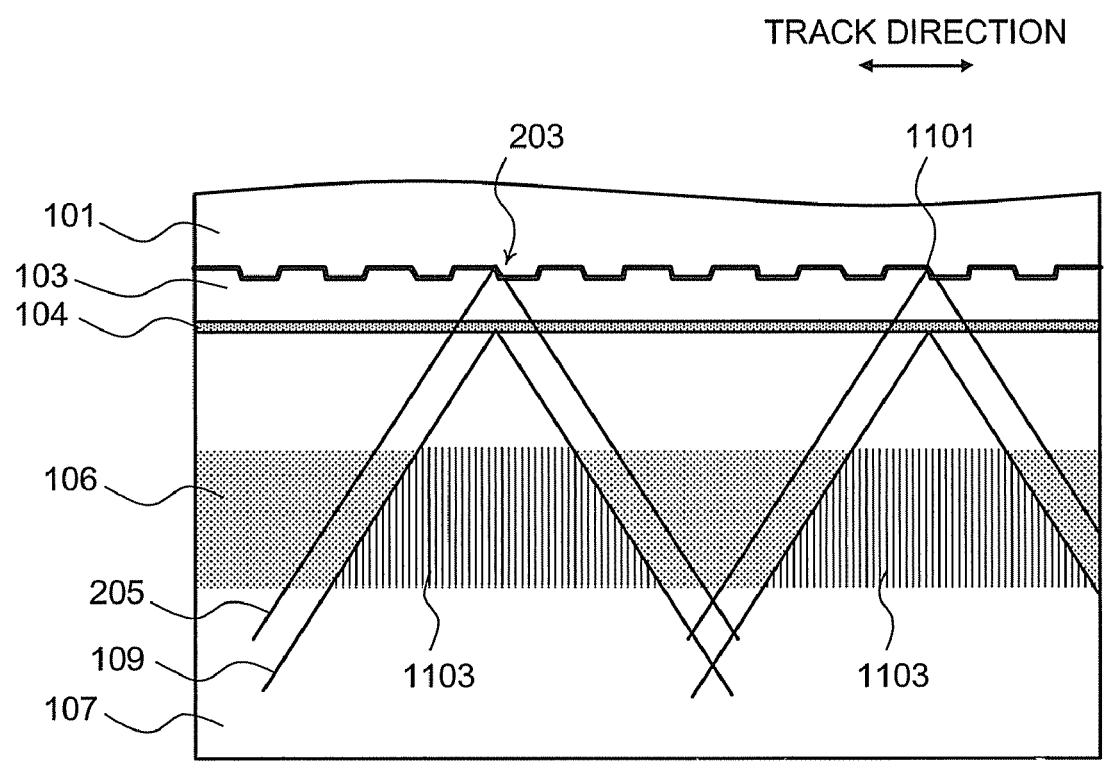
FIG. 11 is a schematic view for explaining positional relation between the pit row for following up and a hologram recorded in a holographic recording medium layer.

FIG. 11 is a schematic view for explaining positional relation between the pit row 203 and a hologram recorded in the holographic recording medium layer 106. The holograms shown in FIG. 11 are enlarged more than the pits in the pit row 203 for convenience of explanation. The track direction runs laterally. The record-playback laser beam 109 records a hologram 1103 in the holographic-recording medium layer 106 while the diffracted beam 205 irradiates a pit end 1101 on the pit row 203. By recording information in a location in the holographic-recording medium layer 106 when the diffracted beam 205 irradiates the pit end 1101 on the pit row 203 preformatted on the servo surface, the high-quality holographic recording can be performed.

According to the first embodiment, because the holographic recording is performed with the record-playback laser beam 109 during the following up control, both of following up servo control and tracking servo control are accurate enough to perform fine alignment of the record-playback laser beam 109 to the target recording portion that enables the high-quality holographic recording.

Figure 12:
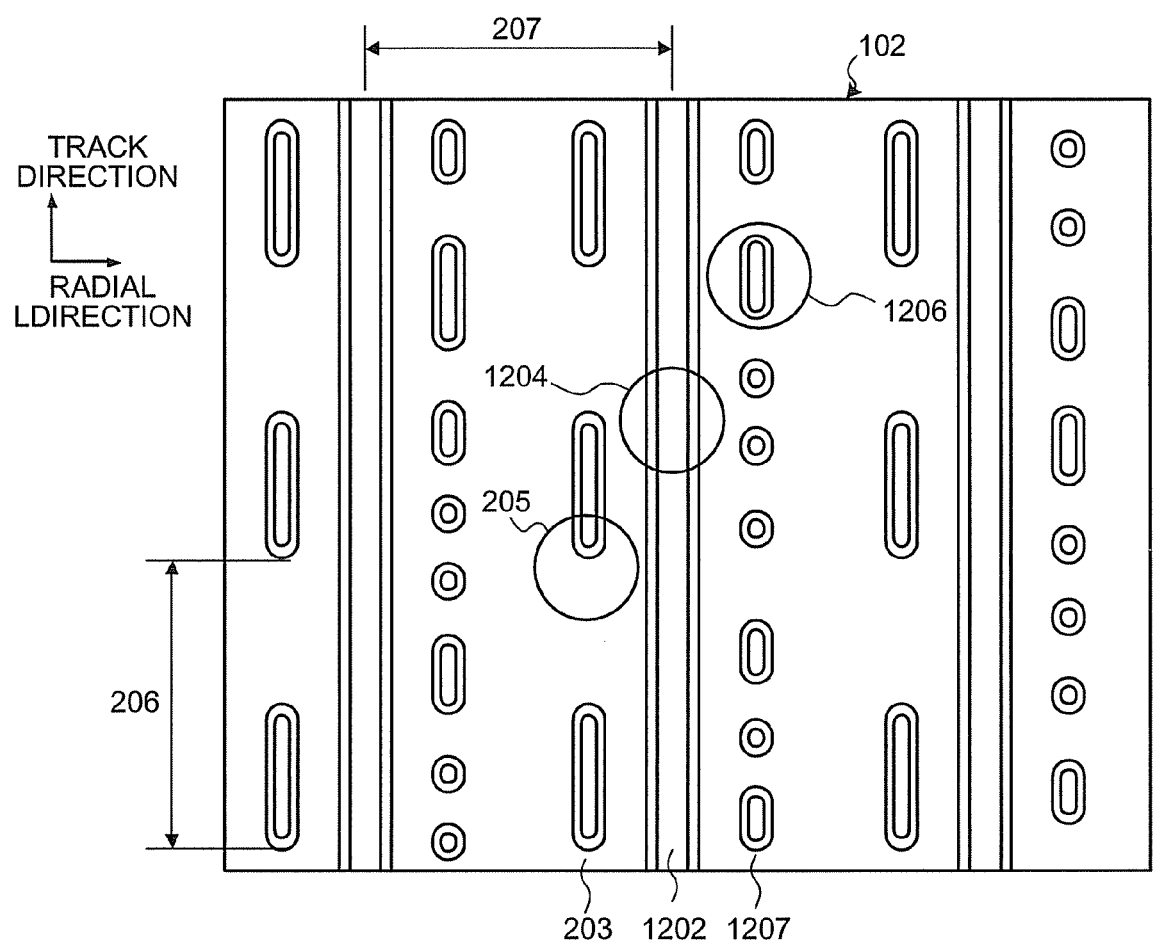
FIG. 12 is an enlarged top view of a servo surface according to a second embodiment.

FIG. 12 is an enlarged top view of the servo surface 102 of a holographic optical disk according to a second embodiment. The cross-sectional structure of the holographic optical disk according to the second embodiment is identical to that of the holographic optical disk according to the first embodiment.

The servo surface 102 includes a sequential guidance pattern 1202 that is used for tracking servo control as a tracking servo area, the pit row 203 for following up servo control, and an address pit row 1207 that includes address information and basic clock information. A set of the sequential guidance pattern 1202, the pit row 203, and the address pit row 1207 is arranged spirally in parallel to one another, starting near the center and ending near the periphery of the holographic optical disk 330. The configuration of the pit row 203 for tracking is identical to that of the pit row 203 according to the first embodiment.

The sequential guidance pattern 1202 is not winding and extends in the track direction. The sequential guidance pattern 1202 does not include the address signals and basic clock information. The address signals and basic clock information is stored in the address pit row 1207.

A distance 207 between two adjacent sequential guidance patterns 1202 is same as the shift distance for shift-multiplexing recording so that a set of the pit row 203, the sequential guidance pattern 1202, and the address pit row 1207 is arranged in a line within the shift distance.

The diffraction grating 316 divides the servo laser beam 108 into a diffracted beam 1204 that is a zeroth order beam, the diffracted beam 205 that is the minus-first order beam, and a diffracted beam 1206 that is the plus-first order beam. Focusing servo control, tracking servo control, and following up servo control is performed by emitting the diffracted beam 1204 to the sequential guidance pattern 1202, the diffracted beam 205 to the pit row 203, and the diffracted beam 1206 to the address pit row 1207, respectively. When following up servo control is performed and the diffracted beam 205 irradiates an end of each pit, a hologram is recorded in the holographic-recording medium layer 106.

The record-playback apparatus for a holographic-optical-disk according to the second embodiment includes the same optical system as that according to the first embodiment except for the acceptance surface of the photodetector 320.

Figure 13:
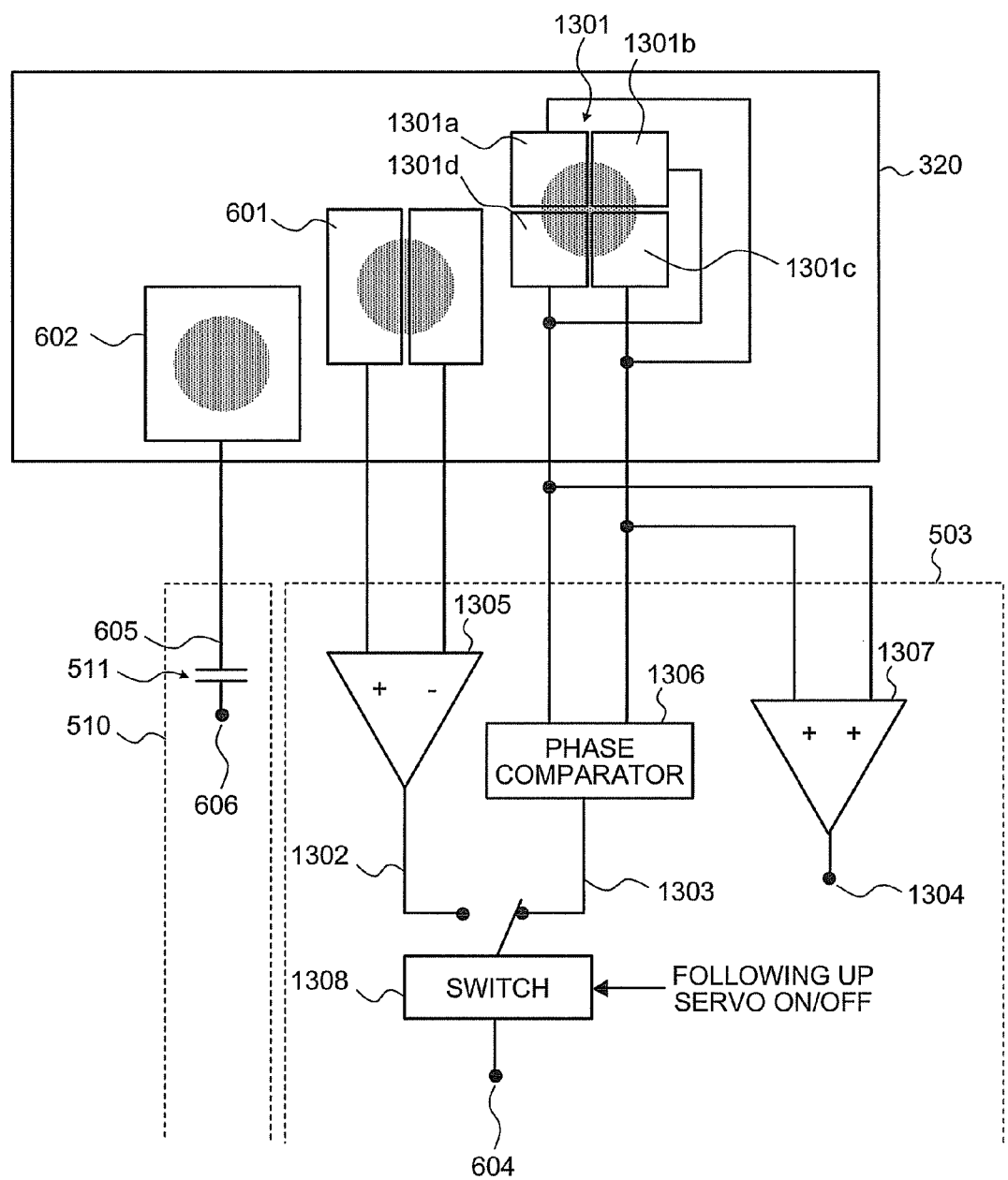
FIG. 13 is a schematic view for explaining a configuration of a photo detector.

FIG. 13 is a schematic view for explaining a configuration of the acceptance surface of the photodetector 320, arrangement of the beam spot on each acceptance surface, and the signal circuit that produces tracking-error signals and following up signals from the accepted beam. The reflection of the diffracted beam 1204 from the servo surface 102 enters the acceptance surface 601, the reflection of the diffracted beam 205 from the servo surface 102 enters the acceptance surface 602, and each of the beams forms a beam spot on the corresponding acceptance surface. Furthermore, the reflection of the diffracted beam 1206 enters a acceptance surface 1301 to form a beam spot thereon.

According to the second embodiment, the tracking control unit 503 switches between the push-pull method and differential phase detection (DPD) method that is used for the DVD-ROM and the like for tracking servo control. More specifically, the tracking control unit 503 performs tracking servo control based on the push-pull method during following up servo control. The following up servo control is performed by the following up control unit 510 having the following up actuator 340 to shift the beam spots of the diffracted beams 1204, 205, and 1206. When following up servo control is not performed, the tracking control unit 503 performs tracking based on the DPD method.

The configuration of the acceptance surface 601 is identical to that according to the first embodiment. The two electrical signals converted from the divided beam spots are input to a differential circuit 1305 in the tracking control unit 503, and a differential signal output from the differential circuit 1305 is output as a push-pull signal 1302 indicative of the tracking error.

On the other hand, the acceptance surface 1301 is divided into four sections of acceptance surfaces 1301a to 1301d. The reflection of the diffracted beam 1206 is divided into four sections on the acceptance surfaces 1301a to 1301d. A trace signal of signals from the beam spots on the acceptance surfaces 1301a and 1301c and a trace signal of signals from the beam spots on the acceptance surfaces 1301b and 1301d are input to a phase comparator 1306 in the tracking control unit 503, and a DPD signal 1303 indicative of phase difference between the two trace signals is output.

When following up servo control starts, based on an instruction from the system controller 504, the tracking control unit 503 connects a switch 1308 to the differential circuit 1305, and inputs the push-pull signal 1302 to start tracking servo control based on the push-pull method.

When following up servo control is not performed, based on an instruction from the system controller 504, the tracking control unit 503 connects the switch 1308 to the phase comparator 1306, and inputs the DPD signal 1303 to perform tracking servo control based on the DPD method.

The two methods of tracking servo are used for the following reason. The push-pull-based tracking servo control generates an offset in a push-pull signal when the objective lens 310 shifts in the radial direction on the disk. On the contrary, during following up servo control, DPD-based tracking servo control cannot be performed due to lack of a DPD signal indicative of a tracking error because the two trace signals do not show any difference if any misalignment occurs when the relative velocity is substantially zero. The tracking control unit 503 according to the second embodiment performs the push-pull-based tracking servo control during following up servo control when the objective lens 310 does not shift in the radial direction, and performs the DPD-based tracking servo control when following up servo control is not performed. This realizes stable tracking servo control no matter following up servo control is performed.

While the method of tracking servo control is switched depending on the following up servo control according to the second embodiment, the DPD-based tracking servo control can be always performed regardless of following up servo control.

The electrical signal 605 is converted from the beam spot on the acceptance surface 602 and AC-coupled by the capacitor 511 in the following up control unit 510, whereby producing the following up signal 606 that is an alternating component. The following up control unit 510 performs following up servo control based on the following up signal 606. The following up servo control is performed same as in the explanation of the first embodiment.

A trace signal of signals from the beam spots on the acceptance surfaces 1301a and 1301c and a trace signal of signals from the beam spots on the acceptance surfaces 1301b and 1301d are input to a sum circuit 1307 in the tracking control unit 503, and an address signal 1304 indicative of sum of the two trace signals is output from the sum circuit 1307. The tracking control unit 503 aligns the record-playback laser beam 109 to the target position on the target track based on the address signal.

Figure 14:
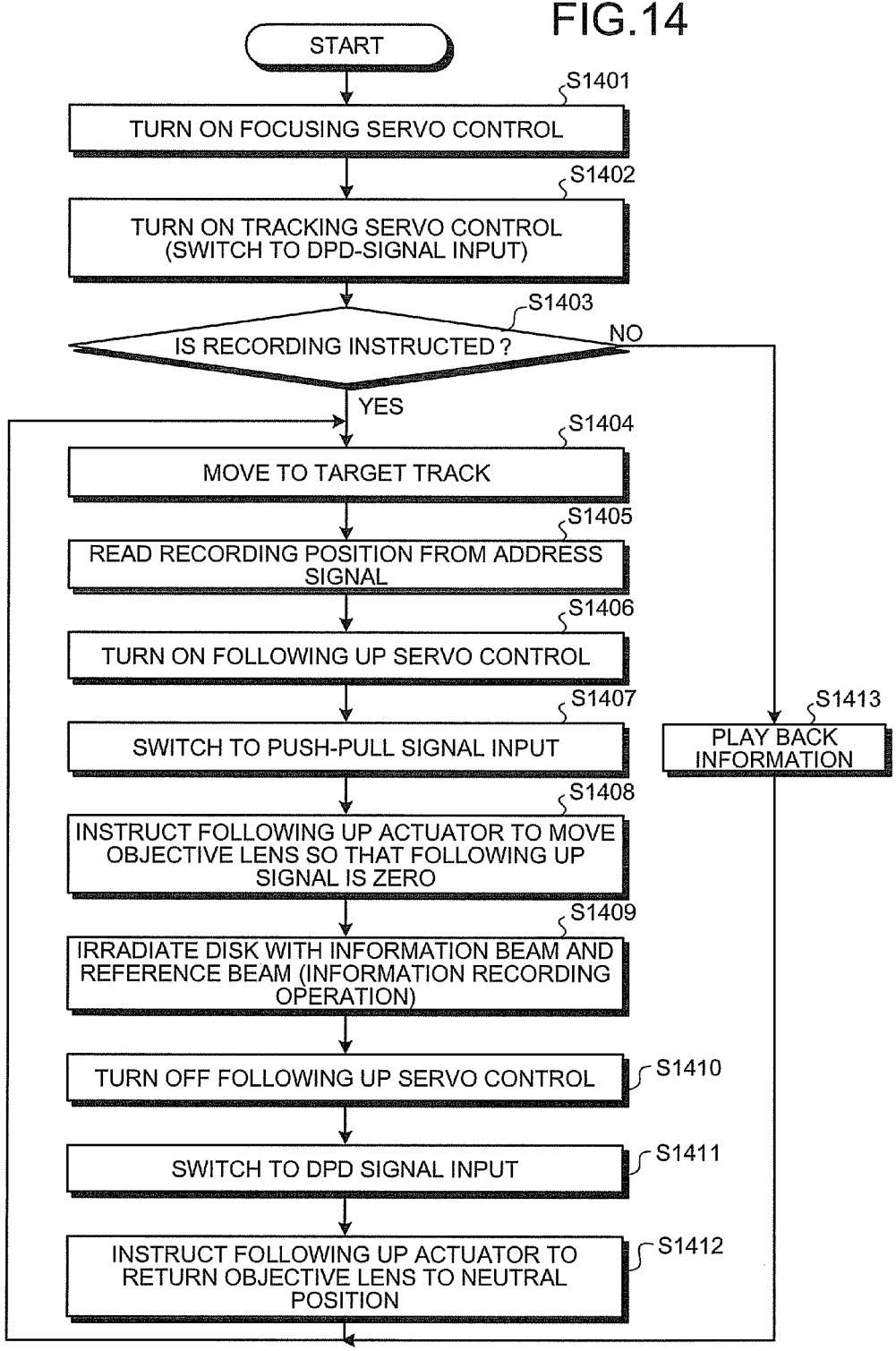
FIG. 14 is a flowchart of a process of recording and playing back holographic record according to the second embodiment.

FIG. 14 is a flowchart of a process of recording and playing back holographic record according to the second embodiment. The focusing control unit 502 turns on focusing servo control based on the instruction from the system controller 504, and starts focusing servo control using the astigmatism method based on the reflection of the servo laser beam 108 accepted by the photodetector 319 (step S1401).

The tracking control unit 503 turns on tracking servo control based on the instruction from the system controller 504, and connects the switch 1308 to the phase comparator 1306, whereby switching to the DPD signal input (step S1402). At this time point, the DPD signal 1303 acquired from the reflection of the diffracted beam 1206 that irradiates the address pit row 1207 is input to start the DPD-based tracking servo control. More specifically, the actuator 312 is driven by the DPD signal acquired from the reflection of the servo laser beam 108 accepted by the acceptance surface 1301.

The system controller 504 determines whether the instructed process is recording on the holographic optical disk 330 (step S1403). When the instruction is not recording (NO at step S1403), the record-playback apparatus plays back the information in the holographic-recording medium layer 106 (step S1413).

On the other hand, when the instruction is to record information on the holographic optical disk 330 (YES at step S1403), the tracking control unit 503 moves the beam spot to the target track (step S1404). The tracking control unit 503 acquires the address signal from the reflection of the diffracted beam 1206 accepted by the acceptance surface 1301 of the photodetector 320 and reads the target position to record the information from the address signal (step S1405).

The following up control unit 510 turns on following up servo control based on the instruction from the system controller 504, and starts following up servo control (step S1406). The tracking control unit 503 connects the switch 1308 to the differential circuit 1305, whereby switching to the push-pull signal input (step S1407). As a result of this, push-pull-based tracking servo control is performed by inputting the push-pull signal 1302 acquired from the reflection of the diffracted beam 1204 from the sequential guidance pattern 1202 during following up servo control. The following up control unit 510 performs following up servo control by acquiring a following up signal from the reflection of the diffracted beam 205 accepted by the acceptance surface 602 of the photodetector 320, driving the following up actuator 340 so that the following up signal indicates substantially zero, and moving the objective lens 310 and the reflecting mirror 309 in the track direction (step S1408). As a result of this, the diffracted beam 205 irradiates an end of a pit on the pit row 203.

The following up control unit 510 controls the semiconductor laser 301 to emit the record-playback laser beam 109 while the following up actuator 340 drives to retain the following up signal at substantially zero (step S1409). The record-playback laser beam 109 is converted into the information beam and the reference beam by the spatial light modulator 304, the information beam and the reference beam interfere with each other in the holographic-recording medium layer 106, and thus the holographic information is recorded.

When the information recording operation is completed, the following up control unit 510 turns off the following up control based on the instruction from the system controller 504 and terminates following up servo control (step S1410). The tracking control unit 503 connects the switch 1308 to the phase comparator 1306, whereby switching to the DPD signal input (step S1411). As a result of this, DPD-based tracking servo control is performed by inputting the DPD signal 1303 while following up servo control is not performed.

The following up control unit 510 then drives the following up actuator 340 to return the objective lens 310 and the reflecting mirror 309 to the neutral position (step S1412). The record-playback apparatus repeats the processes in steps S1403 and after.

According to the second embodiment, because the holographic recording is performed with the record-playback laser beam 109 during the following up control, both of following up servo control and tracking servo control are accurate enough to perform fine alignment of the record-playback laser beam 109 to the target recording position that enables high-quality holographic recording.

Moreover, because the record-playback apparatus according to the second embodiment performs push-pull-based tracking servo control during following up servo control and DPD-based tracking servo control when following up servo control is not performed, stable tracking servo control can be always performed.

Figure 15:
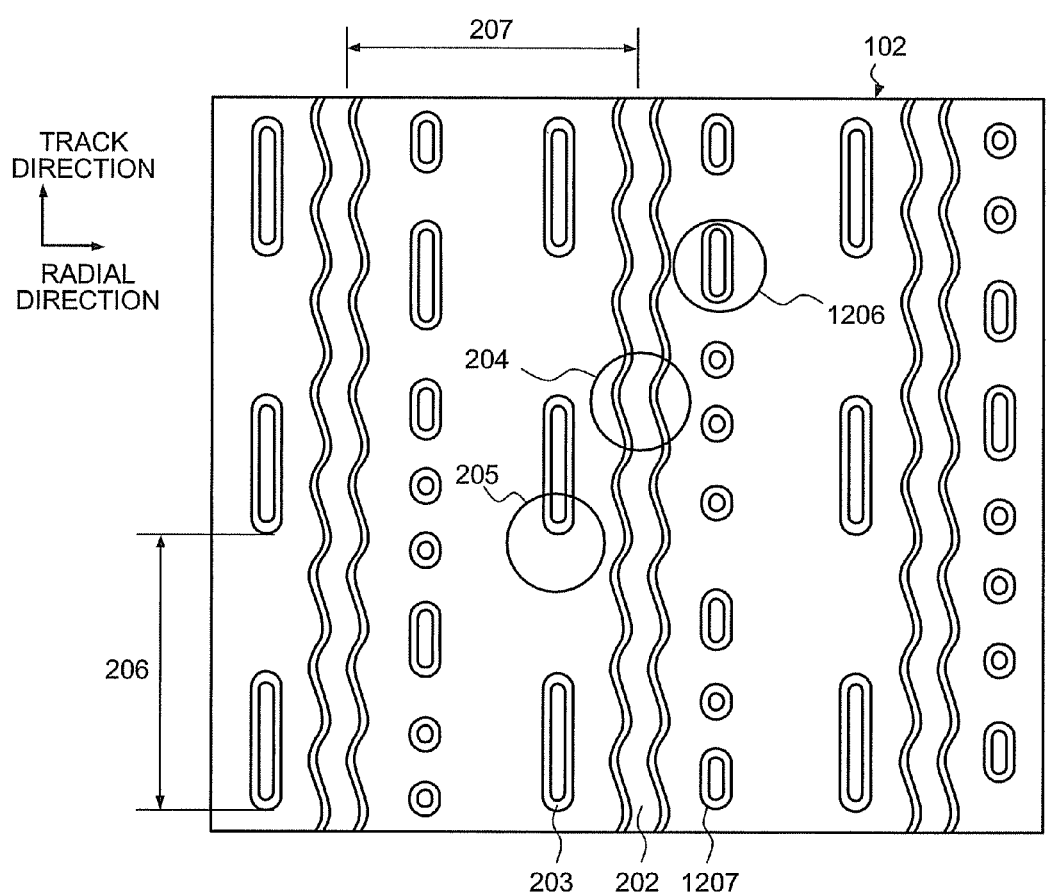
FIG. 15 is an enlarged top view of a servo surface according to a third embodiment.

FIG. 15 is an enlarged top view of the servo surface 102 according to a third embodiment. The cross-sectional structure of the holographic optical disk according to the third embodiment is identical to that of the holographic optical disk according to the first embodiment.

The servo surface 102 includes the wobbling sequential-guidance pattern 202 that is used for tracking servo control as a tracking servo area, the pit row 203 for track-servo control, and the address pit row 1207 that includes address information and basic clock information. A set of the wobbling sequential-guidance pattern 202, the pit row 203, and the address pit row 1207 is arranged spirally in parallel to one another, starting near the center and ending near the periphery of the holographic optical disk 330.

The configuration of the pit row 203 for following up is identical to that of the pit row 203 according to the first embodiment, and the configuration of the address pit row 1207 is identical to that of the address pit row 1207 according to the second embodiment.

The wobbling sequential-guidance pattern 202 runs slightly winding in the radial direction forming sine waves, and extends in the track direction. The address signals and basic clock information that bases timings of various operations are embedded in the wobbles of the wobbling sequential-guidance pattern 202.

The distance 207 between two adjacent wobbling sequential-guidance patterns 202 is same as the shift distance for shift-multiplexing recording so that a set of the pit row 203, the wobbling sequential-guidance pattern 202, and the address pit row 1207 is arranged within the shift distance.

The holographic optical disk according to the third embodiment includes the address information and the basic clock information in both of the wobbling sequential-guidance pattern 202 and the address pit row 1207.

Focusing servo control, tracking servo control, and following up servo control is performed in the same manner as with the second embodiment, and a hologram is recorded at the same timing as with the first and second embodiments.

The record-playback apparatus for a holographic-optical-disk according to the third embodiment includes the same optical system as that according to the first embodiment. The configuration of the servo mechanism according to the third embodiment is identical to that according to the second embodiment. The processes of focusing servo control, tracking servo control, and following up servo control are identical to those according to the second embodiment. The record-playback apparatus according to the third embodiment can be configured not to switch the tracking-servo control methods depending on whether following up servo control is performed.

The tracking control unit 503 according to the third embodiment is configured to align the record-playback laser beam 109 to the target position by reading the address signal from the wobbling sequential-guidance pattern 202 if the address signal cannot be read from the address pit row 1207, or reading signal from the address pit row 1207 if the address signal cannot be read from the wobbling sequential-guidance pattern 202. In this manner, if any one of the wobbling sequential-guidance pattern 202 and the address pit row 1207 has a minor defect, the record-playback apparatus can read the address signal from the other track, and thus highly reliable alignment is achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical-information recording medium comprising:
   a substrate that includes a servo surface;
   an information recording layer laminated on the servo surface of the substrate capable of recording information as a hologram produced by interference between an information beam containing the information and a reference beam;
   a tracking servo area that is formed in a track direction on the servo surface, and that records therein tracking information for tracking servo control; and
   a following up servo area that is formed in the track direction on the servo surface, and that is to be irradiated by a beam emitted from an optical-information recording apparatus for recording the information in the information recording layer so as to make the beam follow a rotation of the substrate, wherein
   the tracking servo area and the following up servo area are arranged in parallel extending in circumferential direction on the substrate.

2. The medium according to claim 1, wherein a plurality of following up pits are formed in the following up servo area at intervals equal to a shifting distance for shift-multiplex recording of the information.

3. The medium according to claim 2, wherein the tracking servo area includes a wobbling guidance pattern that extends with corrugation in the track direction of the substrate, and that is recorded with address information and clock information for aligning the beam to a target position in the information recording layer.

4. The medium according to claim 1, wherein the following up servo area and the tracking servo area are arranged in parallel within the shifting distance for shift-multiplex recording the information extending in the circumferential direction on the substrate.

5. The medium according to claim 1, further comprising:
   an address servo area that is formed in the track direction on the servo surface as a part of the servo pattern, and that is recorded with the address information and the clock information for aligning the beam to a target position in the information recording layer,
   wherein the following up servo area, the tracking servo area, and the address servo area are arranged in parallel extending in circumferential direction on the substrate.

6. The medium according to claim 5, wherein
   the tracking servo area includes a guidance pattern formed extending in the track direction on the substrate, and
   the address servo area includes a plurality of address pits recorded with the address information and the clock information.

7. The medium according to claim 1, further comprising:
   an address servo area that is formed in the track direction on the servo surface as a part of the servo pattern and that is recorded with the address information and the clock information for aligning the beam to the target position in the information recording layer, wherein
   the tracking servo area is recorded with the address information and the clock information, and
   the following up servo area, the tracking servo area, and the address servo area are arranged in parallel extending in circumferential direction on the substrate.

8. The medium according to claim 7, wherein
   the tracking servo area includes the wobbling guidance pattern that extends with corrugation in the track direction of the substrate and that is recorded with the address information and the clock information, and
   the address servo area includes a plurality of address pits recorded with the address information and the clock information.

9. The medium according to claim 5, wherein the following up servo area, the tracking servo area, and the address servo area are arranged in parallel within the shifting distance for shift-multiplex recording the information extending in the circumferential direction on the substrate.

10. An optical-information recording apparatus comprising:
    a motor that rotates an optical-information recording medium;
    a recording light source that emits a recording beam;
    a servo light source that emits a servo beam;
    a spatial light modulator that converts the recording beam to an information beam containing information and a reference beam;
    a diffractive optical element that diffracts the servo beam and divides the servo beam into at least a first diffracted beam and a second diffracted beam;
    a condenser that focuses the information beam and the reference beam on an optical-information recording medium, focuses the first diffracted beam on a following up servo area, and focuses the second diffracted beam on a tracking servo area, the optical-information recording medium being included:
    a substrate that includes a servo surface, an information recording layer laminated on the servo surface of the substrate capable of recording information as a hologram produced by interference between an information beam that includes the information and a reference beam, the tracking servo area that is formed in a track direction on the servo surface, and that records therein tracking information for tracking servo control, and the following up servo area that is formed in the track direction on the servo surface, and that is to be irradiated by a beam so as to make the beam follow a rotation of the substrate, wherein the tracking servo area and the following up servo area are arranged in parallel extending in circumferential direction on the substrate;

a servo photodetector that detects a first reflection reflected from the following up servo area and a second reflection reflected from the tracking servo area;

a irradiation-position shifting unit that shifts irradiation positions of the first diffracted beam and the second diffracted beam on the optical-information recording medium by moving the condenser; and a following up control unit that performs following up servo control to control the irradiation-position shifting unit based on the first reflection by shifting the irradiation positions of the first diffracted beam and the second diffracted beam to follow rotation of the optical-information recording medium so that relative velocity between the optical-information recording medium and the irradiation positions is substantially zero, and that controls the recording light source to emit the recording beam during the following up servo control.

11. The apparatus according to claim 10, further comprising:

a tracking control unit that reads address information of the target position to perform alignment control and tracking servo control, based on the second reflection from the tracking servo area including a wobbling guidance pattern that extends with corrugation in the track direction of the optical-information recording medium and that is recorded with address information and clock information for aligning the beam to the target position in the information recording layer.

12. The apparatus according to claim 10, further comprising:

a tracking control unit that performs tracking servo control, wherein the diffractive optical element diffracts the servo beam and divides the servo beam into at least the first diffracted beam, the second diffracted beam, and a third diffracted beam, the condenser focuses the information beam and the reference beam on the optical-information recording medium, focuses the first diffracted beam on the following up servo area, focuses the second diffracted beam on the tracking servo area, and focuses the third diffracted beam on an address servo area, the optical-information recording medium being included:

the information recording layer, the following up servo area, the tracking servo area, and an address servo area that is formed in the track direction on the servo surface as a part of the servo pattern and recorded with the address information and the clock information for aligning the beam to the target position in the information recording layer, wherein the following up servo area, the tracking servo area, and the address servo area are arranged in parallel extending in circumferential direction on the optical-information recording medium, the servo photodetector detects the first reflection, the second reflection, and a third reflection reflected from the address servo area, and the tracking control unit reads address information of the target position to perform alignment control based on the third reflection.

13. The apparatus according to claim 12, wherein the tracking control unit switches tracking servo methods between when following up servo control is performed and when following up servo control is not performed.

14. The apparatus according to claim 13, wherein the tracking control unit performs tracking servo control based on the second reflection when following up servo control is performed, and performs tracking servo control based on the third reflection from the address servo area when following up servo control is not performed.

15. The apparatus according to claim 14, wherein the servo photodetector includes a first acceptance surface that accepts the first reflection, a second acceptance surface divided into a plurality of sections that accepts the second reflection, and a third acceptance surface divided into a plurality of sections that accepts the third reflection, the tracking control unit performs tracking servo control by push-pull method based on signals converted from the second reflection when following up servo control is performed, and performs tracking servo control by differential phase detection method based on signals converted from the third reflection when following up servo control is not performed.

16. The apparatus according to claim 10, further comprising:

a tracking control unit that performs tracking servo, wherein the diffractive optical element diffracts the servo beam and divides the servo beam into at least the first diffracted beam, the second diffracted beam, and a third diffracted beam, the condenser focuses the information beam and the reference beam on the optical-information recording medium, focuses the first diffracted beam on the following up servo area, focuses the second diffracted beam on the tracking servo area, and focuses the third diffracted beam on an address servo area, the optical-information recording medium being included:

the information recording layer, the following up servo area, the tracking servo area that is formed in the track direction on the servo surface as a part of the servo pattern and recorded with the address information and the clock information for aligning the beam to the target position in the information recording layer, and an address servo area that is formed in the track direction on the servo surface as a part of the servo pattern and recorded with the address information and the clock information, the servo photodetector detects the first reflection, the second reflection, and a third reflection of the third diffracted beam reflected from the address servo area, and the tracking control unit reads address information of the target position to perform alignment control based on one of the second reflection and the third reflection.

17. The apparatus according to claim 10, wherein the following up control unit performs the following up servo control when the servo photodetector detects the first reflection from an end of one of a plurality of following up pits disposed in the following up servo area.

18. The apparatus according to claim 17, wherein the following up control unit determines that the first reflection from the end of the following up pit is detected when a following up signal that is an alternating component of an electrical signal converted from the first reflection is substantially zero, and performs following up servo so that the following up signal is substantially zero.

19. An optical-information recording method comprising:
rotating an optical-information recording medium;
emitting a recording beam;
emitting a servo beam;
converting the recording beam to an information beam containing information and a reference beam;
diffracting the servo beam to divide the servo beam into at least a first diffracted beam and a second diffracted beam;
focusing the information beam and the reference beam on an optical-information recording medium;
focusing the first diffracted beam on a following up servo area;
focusing the second diffracted beam on a tracking servo area, the optical-information recording medium being included:
  a substrate that includes a servo surface,
  an information recording layer laminated on the servo surface of the substrate capable of recording information as a hologram produced by interference between an information beam that includes the information and a reference beam,
  the tracking servo area that is formed in a track direction on the servo surface, and that records therein tracking information for tracking servo control, and
  the following up servo area that is formed in the track direction on the servo surface, and that is to be irradiated by a beam so as to make the beam follow a rotation of the substrate, wherein
  the tracking servo area and the following up servo area are arranged in parallel extending in circumferential direction on the substrate;
detecting a first reflection reflected from the following up servo area and a second reflection reflected from the tracking servo area;
shifting irradiation positions of the first diffracted beam and the second diffracted beam on the optical-information recording medium;
performing following up servo control based on the first reflection by shifting the irradiation positions of the first diffracted beam, and the second diffracted beam to follow rotation of the optical-information recording medium so that relative velocity between the optical-information recording medium and the irradiation positions is substantially zero; and
emitting the recording beam during performing the following up servo control.

* * * * *